United States Patent
Tong et al.

(10) Patent No.: US 10,059,584 B2
(45) Date of Patent: Aug. 28, 2018

(54) CATHODE MATERIAL FOR LOW TEMPERATURE SOLID OXIDE FUEL CELLS

(71) Applicant: Colorado School of Mines, Golden, CO (US)

(72) Inventors: Jianhua Tong, Clemson, SC (US); Ryan Patrick O'Hayre, Golden, CO (US); Meng Shang, Urbana, IL (US); Chuancheng Duan, Lakewood, CO (US)

(73) Assignee: Colorado School of Mines, Golden, CO (US)

( * ) Notice: Subject to any disclaimer, the term of this patent is extended or adjusted under 35 U.S.C. 154(b) by 49 days.

(21) Appl. No.: 15/184,425

(22) Filed: Jun. 16, 2016

(65) Prior Publication Data

US 2016/0301070 A1    Oct. 13, 2016

Related U.S. Application Data

(63) Continuation-in-part of application No. 14/991,027, filed on Jan. 8, 2016.

(60) Provisional application No. 62/101,285, filed on Jan. 8, 2015.

(51) Int. Cl.
| | |
|---|---|
| *H01M 4/485* | (2010.01) |
| *H01M 4/04* | (2006.01) |
| *H01M 8/1016* | (2016.01) |
| *B82Y 30/00* | (2011.01) |
| *H01M 4/88* | (2006.01) |
| *H01M 4/90* | (2006.01) |
| *B82Y 40/00* | (2011.01) |
| *H01M 8/1253* | (2016.01) |
| *H01M 8/126* | (2016.01) |
| *H01M 8/124* | (2016.01) |
| *H01M 8/1246* | (2016.01) |

(52) U.S. Cl.
CPC ........... *B82Y 30/00* (2013.01); *H01M 4/8889* (2013.01); *H01M 4/9033* (2013.01); *B82Y 40/00* (2013.01); *H01M 4/9066* (2013.01); *H01M 8/126* (2013.01); *H01M 8/1246* (2013.01); *H01M 8/1253* (2013.01); *H01M 2008/1293* (2013.01); *H01M 2300/0074* (2013.01); *H01M 2300/0077* (2013.01); *Y02E 60/525* (2013.01); *Y02P 70/56* (2015.11)

(58) Field of Classification Search
CPC . H01M 2008/1293; H01M 2300/0074; H01M 2300/0077; H01M 4/8889; H01M 4/9033; H01M 4/9066; H01M 8/1253; H01M 8/126; H01M 4/8621; H01M 4/9075; H01M 8/1246
See application file for complete search history.

(56) References Cited

U.S. PATENT DOCUMENTS

| | | |
|---|---|---|
| 3,377,203 A | 4/1968 | Hans-Heinrich et al. |
| 2007/0122674 A1 | 5/2007 | Horiuchi et al. |
| 2016/0036064 A1 | 2/2016 | Tong et al. |
| 2016/0204444 A1 | 7/2016 | Tong et al. |

OTHER PUBLICATIONS

CERVERA et al., "Structural study and proton transport of bulk nanograined Y-doped BaZrO3 oxide protonics materials," Solid Slate Ionics, 2008, vol. 179(7-8), pp. 236-242, 1 page, abstract only.
Cook et al., "On the systematic selection of perovskite solid electrolytes for intermediate temperature fuel cells," Solid State Ionics, 1991, vol. 45(3-4), pp. 311-321, 2 pages, abstract only.
Cook et al., "Perovskite Solid Electrolytes for Intermediate Temperature Solid Oxide Fuel Cells," Journal of the Electrochemical Society, 1900, vol. 137(10), pp. 3309-3310.
Diethelm et al., "Improved stability of La0.5Sr0.5FeO3 by Ta-doping for oxygen separation membrane application," Solid State Ionics, 2009, vol. 180(11-13), pp. 857-860, 1 page, abstract only.
Ding et al., "Electrochemical performance of BaZr0.1Ce0.7Y0.1Yb0.1O3-δ electrolyte based proton-conducting SOFC solid oxide fuel cell with layered perovskite PrBaCo2O5+δ cathode," Journal of Power Sources, 2011, vol. 196, pp. 2602-2607.
Haworth et al., "Yttrium doped BSCF membranes for oxygen separation," Separation and Purification Technology, 2011, vol. 81(1), pp. 88-93, 1 page, abstract only.
Islam et al., "Doping and defect association in AZrO3 (A=Ca, Ba) and LaMO3 (M=Sc, Ga) perovskite-type ionic conductors," Dalton Transactions, 2004, pp. 3061-3066.
Kim et al., "Micro Solid Oxide Fuel Cell Fabricated on Porous Stainless Steel; A New Strategy for Enhanced Thermal Cycling Ability," Scientific Reports, 2016, vol. 6, 22443, pp. 1-8.
Kreuer, "Proton-Conducting Oxides," Annu. Rev. Mater. Res., 2003, vol. 33, pp. 333-359, 1 page, abstract only.
Li et al., "Synthesis and electrical properties of Co-doped Y0.08Sr0.92TE03-δ as a potential SOFC anode," Solid State Ionics, 2008, vol. 179(27-32), pp, 1588-1592, 1 page, abstract only.
Li et al., "Synthesis and properties of Y-doped SrTiO3 as an anode material for SOFCs," Journal of Power Sources, 2007, vol. 166(1), pp. 47-52.
Liang et al., "Effect of various dopants on the tunable and dielectric properties of Ba0.6Sr0.4TiO3 ceramics," Ceramics International, 2005, vol. 31(8), pp. 1097-1101, abstract only.
Martynczuk et al., "Aluminum-Doped Perovskites As High-Performance Oxygen Permeation Materials," Chem. Mater., 2009, vol. 21(8), pp. 1586-1594, 2 pages, abstract only.

(Continued)

*Primary Examiner* — Carlos Barcena
(74) *Attorney, Agent, or Firm* — Sheridan Ross P.C.

(57) ABSTRACT

The present invention relates to a solid oxide (or protonic ceramic) fuel cell, a cathode for a solid oxide (or protonic ceramic) fuel cell, and a method of making the same. More specifically, the cathode for a solid oxide (or protonic ceramic) fuel cell utilizes a phase-pure perovskite structure of the compound $BaCo_{0.4}Fe_{0.4}Zr_{0.2-x}Y_xO_{3-\delta}$, where x is between about 0 and about 0.2. The cathode material may then be utilized in a SOFT or a PCFC as either a thin film porous cathode or as nanoparticles infiltrated into a cathode bone having a different structure.

20 Claims, 29 Drawing Sheets
(23 of 29 Drawing Sheet(s) Filed in Color)

(56) References Cited

OTHER PUBLICATIONS

Nikodemski et al., "Solid-state reactive sintering mechanism for proton conducting ceramics," Solid State Ionics, 2013, vol. 253, pp. 201-210, 1 page, abstract only.
Sammells et al., "Rational selection of advanced solid electrolytes for intermediate temperature ifuel cells," Solid state Ionics, 1992, vol. 52(1-3), pp. 111-123, 2 pages, abstract only.
Shang et al., "A promising cathode for intermediate temperature protonic ceramic fuel cells: $BaCo_{0.4}Fe_{0.4}Zr_{0.2}O_{3-\delta}$," RSC Advances, 2013, 3(36), pp. 15769-15775, 2 pages, abstract only.
Shang et al., "The Design and Realization of a Cost-Effective Approach for Protonic Ceramic Fuel Cells," The Royal Society of Chemistry, 2012, pp. 1-5.
Shao et al., "A High-Performance Cathode for the Next Generation of Solid-Oxide Fuel Cells," Nature, 2004, vol. 431, pp. 170-173, 1 page, abstract only.
Suksamai et al., "Measurement of proton and oxide ion fluxes in a working Y-doped $BaCeO_3$ SOFC," Solid State Ionics, 2007, vol. 178(7-10), pp. 627-634, 1 page, abstract only.
Tong et al., "Cost-effective solid-state reactive sintering method for high conductivity proton conducting yttrium-doped barium zirconium ceramics," Solid State Ionics, 2010, vol. 181(11-12), pp. 496-503, 1 page, abstract only.
Tong et al., "Proton-conducting yttrium-doped barium cerate ceramics synthesized by a cost-effective solid-state reactive sintering method," Solid State Ionics, 2010, vol. 181(33-34), pp. 1486-1498, 1 page, abstract only.
Tong et al., "Solid-state reactive sintering mechanism for large-grained yttrium-doped barium zirconate proton conducting ceramics," Journal of Materials Chemistry, 2010, vol. 20(30), pp. 6333-6341.
Ullmann et al., "Estimation of effective ionic radii in highly defective perovskite-type oxides from experimental data," Journal of Alloys and Compounds, 2001, vol. 316, pp. 153-158.
Wilson et al., "Quantitative three-dimensional microstructure of a solid oxide fuel cell cathode," Electrochemistry Communications, 2009, vol. 11(5), pp. 1052-1056, 1 page, abstract only.
Yang, et al., "A Novel Composite Cathode for Low-Temperature SOFCs Based on Oxide Proton Conductors," Advanced Materials, 2008, vol. 20, pp. 3280-3283.
Yang et al., "Enhanced Sulfur and Coking Tolerance of a Mixed Ion Conductor for SOFCs: $BaZr_{0.1}Ce_{0.7}Y_{0.2-x}Yb_xO_{3-\delta}$," Science, 2009, vol. 326(5949), pp. 126-129, 1 page, abstract only.
Zhang et al., "Double-site yttria-doped $Sr_{1-x}Y_xCo_{1-y}Y_yO_{3-\delta}$ perovskite oxides as oxygen semi-permeable membranes," Journal of Alloys and Compounds, 2009, vol. 474, pp. 477-483.
Zhang et al., "Effect of V and Nb codoping on the microstructure and electrical properties of lead zirconate titanate ceramics," Solid State Ionics, 2004, vol. 166(1-2), pp. 219-223, 1 page, abstract only.
Zhao et al., "investigation of Mixed Conductor $BaCo_{0.7}Fe_{0.3-x}Y_xO_{3-\delta}$ with High Oxygen Permeability," Journal of Physical Chemistry C, 2010, vol. 114(41), pp. 17975-17981, 1 page, abstract only.
Zhi et al., "Incorporation of yttrium in barium titanate ceramics," Journal of the American Ceramic Society, 1999, vol. 82(5), pp. 1345-1348.
Clark et al. "Anomalous low-temperature proton conductivity enhancement in a novel protonic nanocomposite," Physical Chemistry Chemical Physics, Mar. 2014, vol. 16, No. 11, pp. 5076-5080.
Zuo et al. "$Ba(Zr_{0.1}Ce_{0.7}Y_{0.2})O_{3-\delta}$ as an Electrolyte for Low-Temperature Solid-Oxide fuel Cells," Advanced Materials, Nov. 2006, vol. 18, pp. 3318-3320.
Official Action for U.S. Appl. No. 14/621,091, dated Feb. 14, 2017 9 pages Restriction Requirement.
Official Action for U.S. Appl. No. 14/621,091, dated May 3, 2017 11 pages.
Official Action for U.S. Appl. No. 14/621,091, dated Nov. 21, 2017 9 pages.
Official Action for U.S. Appl. No. 14/991,027, dated Mar. 15, 2017 6 pages Restriction Requirement.
Official Action for U.S. Appl. No. 14/991,027, dated Jun. 9, 2017 9 pages.
Official Action for U.S. Appl. No. 14/991,027, dated Oct. 23, 2017 6 pages.
Notice of Allowance for U.S. Appl. No. 14/991,027, dated Feb. 5, 2018 8 pages.

CATHODE MATERIAL FOR LOW TEMPERATURE SOLID OXIDE FUEL CELLS

CROSS REFERENCE TO RELATED APPLICATIONS

This application is a continuation-in-part application of Ser. No. 14/991,027, filed on Jan. 8, 2016, which claims priority under 35 U.S.C. § 119(e) to U.S. Provisional Application Ser. No. 62/101,285, filed Jan. 8, 2015. Each of these applications are incorporated herein in their entirety by reference.

GOVERNMENT LICENSE RIGHTS

This invention was made with government support under grant DE-AR0000493 awarded by the U.S. Department of Energy. The government has certain rights in the invention.

TECHNICAL FIELD

This invention relates to the field of protonic ceramic electrochemical devices and solid oxide fuel cells, and, more specifically, to a cathode material for use in intermediate temperature protonic ceramic fuel cells and low temperature in solid oxide fuel cells. The invention also relates to methods for producing protonic ceramic fuel cells or solid oxide fuel cells comprising this cathode material.

BACKGROUND

The following text should not be construed as an admission of knowledge in the prior art. Furthermore, citation or identification of any document in this application is not an admission that such document is available as prior art to the present invention, or that any reference forms a part of the common knowledge in the art.

Proton conducting fuel cells (PCFCs), and other intermediate temperature protonic ceramic electrochemical devices (IT-PCECDs) exhibit several advantages over traditional solid oxide fuel cells (SOFCs) in terms of lower operation temperature (300° C.-600° C.) and higher efficiency. Among proton conducting ceramics, the recently reported proton conductor $BaCe_{0.7}Zr_{0.1}Y_{0.1}Yb_{0.1}O_{3-\delta}$ (BCZYYb) has shown particularly promising performance in single-cell fuel cell demonstrations at test temperatures around 750° C. However, the maximum power density of the PCFCs achieved (~1100 mW/cm$^2$ and at 750° C.) was much lower than that of SOFCs.

Very few promising performances for PCFCs at temperatures lower than 600° C. have been reported. One of the challenges for the development of high performance, intermediate temperature PCFCs lies in the discovery of appropriate cathode materials. The poor performance of most PCFCs is attributed, in part, to the use of cathodes that were developed for SOFCs operating at much higher temperatures between about 700° C. and 1000° C. whereas the target PCFC operation temperatures are near 500° C. One reason for this is that the application of conventional SOFC cathodes, which are based on either electron-conducting oxides or mixed oxygen ion and electron-conducting oxides, to electrolytes developed for PCFCs restricts the cathode reaction only to points where the electrolyte and cathode phases meet.

Although mixed oxygen ion and electron conducting oxides and proton conducting oxides have been researched extensively, none have been promising. For example, although yttrium-doped barium zirconates (BZY) are excellent proton conductors and also exhibit some oxygen-ion conductivity in dry reducing atmospheres, its electronic conductivity is extremely small. However, it is unquestionable that a prerequisite for a promising intermediate temperature PCFC cathode is high electronic conductivity. Similarly, while $BaCo_{0.4}Fe_{0.4}Zr_{0.2}O_{3-\delta}$ (BCFZ) provides a strong electrochemical performance and a good stability, making it compatible with BCZYYb electrolytes, its low proton transport limits the cells performance.

Accordingly, there exists a need in the art for an intermediate temperature PCFC cathode material having a high electronic conductivity, high oxygen ion transport, high proton transport, and good compatibility with PCFC electrolytes.

There is also a need for a stable cathode for low temperature SOFCs. Cathodes that operate at low temperatures can have complications. For example, SOFCs must demonstrate excellent long-term durability and thermal robustness in addition to good performance in commercial applications. Poor thermal cycling stability is usually caused by poor thermal shock resistance due to mismatches in thermal expansion characteristics between the various components of the membrane electrode assembly (MEA) and/or stress-induced delamination between electrode and electrolyte. In most SOFCs, the cathode is usually sintered separately and at lower temperature compared with anode and electrolyte in order to get a porous structure with high surface area. However, this separate sintering can lead to a weak electrode/electrolyte interface that is susceptible to delamination. Despite the crucial importance of thermal-cycle stability, few studies in the literature have examined rapid thermal cycling in SOFCs. As a notable exception, Kun Joong Kim (Kim et al., *Micro Solid Oxide Fuel Cell Fabricated on Porous Stainless Steel: A New Strategy for Enhanced Thermal Cycling Ability*, Sci. Rep., 6, 22443 (2016), which is incorporated by reference) recently demonstrated good stability after 10 quick thermal cycles for micro SOFCs fabricated on porous stainless steel.

These and other issues are addressed with the present invention.

SUMMARY

In view of the limitations now present in the prior art cathodes for PCFCs, SOFCs, and other IT-PCECDs, the present invention provides a new cathode which has improved oxygen ion transport properties and electronic conductivity over known prior art cathodes at low and intermediate temperatures, and methods for making the cathode and PCFCs or SOFCs containing the cathode.

The present invention relates to a triple conducting (oxygen ion, proton, and electron) perovskite-type oxide, which is a promising cathode material for oxygen reduction reactions for PCFCs and SOFCs. The area specific resistance of this cathode material in symmetrical cells is lower than 0.15 $\Omega cm^2$ with gold as the current collector at 750° C. in wet air, which is much better than currently available cathodes. A single protonic ceramic fuel cell constructed from this cathode with BCZYYb electrolyte and BCZYYb—Ni anode demonstrated a power density of 584 mW/cm$^2$ at 600° C. and 1273 mW/cm$^2$ at 750° C.

The oxygen reduction reaction (ORR) kinetic is very low for IT-PCECDs such as PCFCs and protonic ceramic electrolysis cells (PCECs), which greatly hindered the practical application of IT-PCECDs. The disclosed perovskite-type multi-component compound showed triple (oxygen ion, proton, and electron) conductivities under wet oxidizing atmospheres, resulting in high ORR performance at intermediate temperature (300° C.-750° C.). This new ORR catalyst can even be expanded to the low temperature electrochemical devices such as electrocatalysts for alkaline fuel cell, air metal batteries, etc.

An aspect of the present invention is a cathode for use in a protonic ceramic fuel cell. A further aspect of the present invention is a cathode for use in a protonic ceramic fuel cell, the cathode including $BaCo_{0.4}Fe_{0.4}Zr_{0.2-x}Y_xO_{3-\delta}$.

Another aspect of the present invention is a protonic ceramic fuel cell having a cathode including $BaCo_{0.4}Fe_{0.4}Zr_{0.2-x}Y_xO_{3-\delta}$, an electrolyte, and an anode.

Yet another aspect of the present invention is a method of fabricating a protonic ceramic fuel cell, having the steps of depositing a precursor electrolyte layer on at least a portion of an anode, depositing a precursor cathode layer on at least a surface of the precursor electrolyte layer to form a structure, and heating the structure to between about 1200° C. and about 1600° C. for between about 5 hours and about 25 hours to form the protonic ceramic fuel cell including an anode layer, an electrolyte layer, and a cathode layer including $BaCo_{1-x-y-z}Fe_xZr_yY_zO_{3-\delta}$ (where x+y+z=1).

An aspect of the present invention is a novel cathode material for low-temperature SOFCs that offers high ORR activity as well as excellent thermal cycle stability. The cathode material, $BaCo_{0.4}Fe_{0.4}Zr_{0.1}Y_{0.1}Y_{3-\delta}$ (BCFZY0.1), was originally developed for protonic ceramic fuel cells (PCFCs) as it possesses mixed oxygen ion, proton and electron conductivity and high ORR activity at low temperatures. However, this cathode material can also be an excellent cathode for low-temperature SOFCs because of possesses a much lower activation energy (~80 kJ/mol) than most other cathode alternatives (FIG. 1a). When applied to PCFCs, BCFZY0.1 has demonstrated excellent long-term stability (>1400 hours without loss in performance) and good low-temperature performance (>450 mW/cm² at 500° C.).

An aspect of the invention is a method of fabricating a solid oxide fuel cell. The method includes depositing a precursor electrolyte layer on at least a portion of an anode layer, depositing a precursor cathode layer on at least a surface of the precursor electrolyte layer to form a structure, and heating the structure to between about 1200° C. and about 1600° C. for between about 5 hours and about 25 hours to form the solid oxide fuel cell comprising the anode layer, an electrolyte layer, and a cathode layer comprised of $BaCo_{0.4}Fe_{0.4}Zr_{0.2-x}Y_xO_{3-\delta}$.

An aspect of the invention is a solid oxide fuel cell. The solid oxide fuel cell includes a cathode, wherein the material of the cathode is $BaCo_{0.4}Fe_{0.4}Zr_{0.2-x}Y_xO_{3-\delta}$, an electrolyte, and an anode.

An aspect of the invention is a cathode for use in a solid oxide fuel cell that includes $BaCo_{0.4}Fe_{0.4}Zr_{0.2-x}Y_xO_{3-\delta}$.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

Figure 1A:
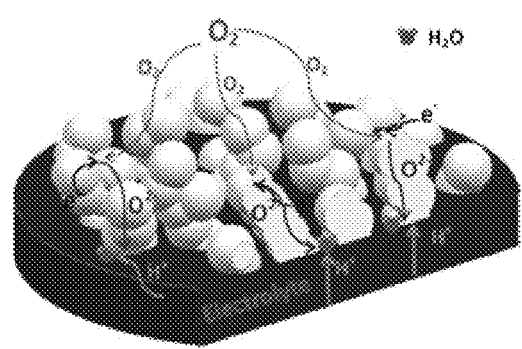
FIG. 1A is a schematic of the oxygen reduction reaction mechanism for a PCFC with a mixed ionic and electronic cathode.

The present invention relates to cathodes for use in a PCFC, a PCFC containing the novel cathode, and methods of fabricating the same.

As provided herein, the abbreviations as used within this patent application have the following meanings:

"BCFZY" means BaCo$_{0.4}$Fe$_{0.4}$Zr$_{0.2-x}$Y$_x$O$_{3-\delta}$.

"BSCF" means Ba$_{0.5}$Sr$_{0.5}$Co$_{0.8}$Fe$_{0.23-\delta}$.

"BCFZY0.1" means BaCo$_{0.4}$Fe$_{0.4}$Zr$_{0.1}$Y$_{0.1}$O$_{3-\delta}$.

"BCZYYb" means BaCe$_{0.7}$Zr$_{0.1}$Y$_{0.1}$Yb$_{0.1}$O$_{3-\delta}$ or precursor solid mixture of BaCO$_3$, CeO$_2$, ZrO$_2$, Y$_2$O$_3$, and Yb$_2$O$_3$ according to the formula of BaCe$_{0.7}$Zr$_{0.1}$Y$_{0.1}$Yb$_{0.1}$O$_{3-\delta}$.

"BCFZ" means BaCo$_{0.4}$Fe$_{0.4}$Zr$_{0.2}$O$_{3-\delta}$ or precursor solution of mixed Ba(NO$_3$)$_2$, Ce(NO$_3$)$_3$, Co(NO$_3$)$_2$, Fe(NO$_3$)$_3$, and ZrO(NO$_3$)$_2$ according to the formula of BaCo$_{0.4}$Fe$_{0.4}$Zr$_{0.2}$O$_{3-\delta}$.

"BCZY63" means BaCe$_{0.6}$Zr$_{0.3}$Y$_{0.1}$O$_{3-\delta}$ or precursor solid mixture of BaCO$_3$, CeO$_2$, ZrO$_2$, and Y$_2$O$_3$ according to the formula of BaCe$_{0.6}$Zr$_{0.3}$Y$_{0.1}$O$_{3-\delta}$;

"BZY" refers generally to yttrium-doped barium zirconates.

"BZY20" means BaZr$_{0.8}$Y$_{0.2}$O$_{3-\delta}$ or precursor solid mixture of BaCO$_3$, ZrO$_2$, and Y$_2$O$_3$ according to the formula of BaZr$_{0.8}$Y$_{0.2}$O$_{3-\delta}$.

"BSFZ" means Ba$_{0.5}$Sr$_{0.5}$Fe$_{0.8}$Zn$_{0.2}$O$_{3-\delta}$.

"SDC" means Sm$_{0.2}$Ce$_{0.8}$O$_{2-\delta}$.

"GDC" means Gd$_{0.15}$Ce$_{0.85}$O$_{2-\delta}$.

"YSZ" means yttria-stabilized zirconia.

"LSGM" means Sr and Mg doped lanthanum gallate.

"IT-PCECD" means intermediate temperature protonic ceramic electrochemical devices.

"ORR" means oxygen reduction reaction.

"PCEC" means protonic ceramic electrolysis cell.

"PCFC" means protonic ceramic fuel cell.

"SOFC" means solid oxide fuel cell.

"SSRS" means solid state reactive sintering.

The following detailed description illustrates the invention by way of example and not by way of limitation. This description will clearly enable one skilled in the art to make and use the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An aspect of the present invention is a cathode for use in a protonic ceramic fuel cell. A further aspect of the present invention is a cathode for use in a protonic ceramic fuel cell, the cathode including BaCo$_{0.4}$Fe$_{0.4}$Zr$_{0.2-x}$Y$_x$O$_{3-\delta}$.

Without wishing to be bound to any theory, it is believed that the partial substitution of yttrium for zirconium improves the thermal and chemical stability of the cubic perovskite structure, tailors the oxygen vacancy concentration, and increases ionic conductivity. Furthermore, from a structural viewpoint, crystals with a large lattice parameter usually have a large free volume, making them favorable for the migration of oxygen ions. Accordingly, by introducing Y$^{3+}$, an amphoteric dopant ion, into the perovskite structure, either at the A-site or B-site, various performances can be increased. For example, by inserting Y$^{3+}$ at the A-site, it can be used as a donor dopant and enhance the electrical conductivity, while also acting as a sintering dopant and promoting densification during sintering. At the B-site, it is used as an acceptor dopant to create oxygen vacancies as charge compensation, thus producing the oxygen ionic or protonic conductivity.

Further, in the mixed conducting materials, the weak B-O-B bond is favored because it will lead to easier transportation of oxygen ions. Thus, when doped at the B-site, the large size of Y$^{3+}$ ($r_{CN=6}$=0.90 Å) helps to stabilize the cubic structure of the systems with t>1 (where "t" is tolerance factor) down to room temperature by making the tolerance factor approach 1.0.

In one embodiment of the present invention, the cathode has a phase-pure perovskite structure. In another embodiment of the present invention, the value of x is between about 0 and about 0.2. More preferably, the value of x is 0.1.

In another embodiment of the present invention, the value of δ is about 0 to about 0.3. In yet another embodiment of the present invention, the cathode is a porous thin film cathode. In another embodiment, the cathode includes a cathode bone of a formula $BaCe_{0.6}Zr_{0.3}Y_{0.1}O_{3-\delta}$. In a further embodiment, the $BaCo_{0.4}Fe_{0.4}Zr_{0.1}Y_{0.1}Y_{3-\delta}$ is a plurality of nanoparticles and the plurality of nanoparticles are deposited on at least one wall of the cathode bone.

Another aspect of the present invention is a protonic ceramic fuel cell. A further aspect of the present invention is a protonic ceramic fuel cell having a cathode including $BaCo_{0.4}Fe_{0.4}Zr_{0.2-x}Y_xO_{3-\delta}$, an electrolyte, and an anode.

In one embodiment of the present invention, the cathode of the protonic ceramic fuel cell has an x value of about 0 to about 0.2. More preferably, the cathode has an x value of 0.1. In another embodiment of the present invention, the value of δ in the cathode material is about 0 to about 0.3. In another embodiment of the present invention, the electrolyte of the protonic ceramic fuel cell is at least one of $BaCe_{0.7}Zr_{0.1}Y_{0.1}Yb_{0.1}O_{3-\delta}$-1.0 wt % NiO, $BaCe_{0.7}Zr_{0.1}Y_{0.1}Yb_{0.1}O_{3-\delta}$-1.0 wt % CoO, $BaCe_{0.7}Zr_{0.1}Y_{0.1}Yb_{0.1}O_{3-\delta}$-1.0 wt % CuO, $BaCe_{0.7}Zr_{0.1}Y_{0.1}Yb_{0.1}O_{3-\delta}$-1.0 wt % ZnO, $BaZr_{0.8}Y_{0.2}O_{3-\delta}$-1.0 wt % NiO, $BaZr_{0.8}Y_{0.2}O_{3-\delta}$-1.4 wt % CuO, B aZro.s$Y_{0.2}O_{3-\delta}$-1.0 wt % CoO, BaZr0.8$Y_{0.2}O_{3-\delta}$-1.0 wt % ZnO, $BaCe_{0.6}Zr_{0.3}Y_{0.1}O_{3-\delta}$-1.3 wt % CuO, $BaCe_{0.6}Zr_{0.3}Y_{0.1}O_{3-\delta}$-1.0 wt % NiO, $BaCe_{0.6}Zr_{0.3}Y_{0.1}O_{3-\delta}$-1.0 wt % CoO, $BaCe_{0.6}Zr_{0.3}Y_{0.1}O_{3-\delta}$-1.0 wt % ZnO, $BaCe_{0.8}Y_{0.2}O_{3-\delta}$-1.0 wt % CoO, $BaCe_{0.8}Y_{0.2}O_{3-\delta}$-1.0 wt % NiO, $BaCe_{0.8}Y_{0.2}O_{3-\delta}$-1.0 wt % ZnO, and $BaCe_{0.8}Y_{0.2}O_{3-\delta}$-1.0 wt % CuO. In yet another embodiment of the present invention, the anode of the protonic ceramic fuel cell is at least one of $BaCe_{0.7}Zr_{0.1}Y_{0.1}Yb_{0.1}O_{3-\delta}$—Ni, $BaZr_{0.8}Y_{0.2}O_{3-\delta}$—Ni, $BaCe_{0.6}Zr_{0.3}Y_{0.1}O_{3-\delta}$—Ni, and $BaCe_{0.8}Y_{0.2}O_{3-\delta}$—Ni. In yet another embodiment of the present invention, the cathode of the protonic fuel cell is a porous thin filar cathode. In another embodiment, the cathode of the protonic fuel cell further includes a cathode bone of a formula of $BaCe_{0.6}Zr_{0.3}Y_{0.1}O_{3-\delta}$. In a further embodiment, the $BaCo_{0.4}Fe_{0.4}Zr_{0.1}Y_{0.1}O_{3-\delta}$ is a plurality of nanoparticles and the plurality of nanoparticles are deposited on at least one wall of the cathode bone. In yet another embodiment of the present invention, the cathode has a phase-pure perovskite structure.

Yet another aspect of the present invention is a method of fabricating a protonic ceramic fuel cell. A further aspect of the present invention is a method of fabricating protonic ceramic fuel cell, having the steps of depositing a precursor electrolyte layer on at least a portion of an anode, depositing a precursor cathode layer on at least a surface of the precursor electrolyte layer to form a structure, and heating the structure to about 1200° C.-1600° C. for about 5 hours to about 25 hours to form the protonic ceramic fuel cell including an anode layer, an electrolyte layer, and a cathode layer including $BaCo_{0.4}Fe_{0.4}Zr_{0.2-x}Y_xO_{3-\delta}$.

In other embodiments of the present invention, the cathode layer has a thickness of between about 5 and about 70 microns. In another embodiment of the present invention, the value of x in the cathode material is between about 0 and about 0.2. More preferably, the value of x is 0.1. In yet another embodiment of the present invention, the anode layer is at least one of $BaCe_{0.7}Zr_{0.1}Y_{0.1}Yb_{0.1}O_{3-\delta}$—Ni, $BaZr_{0.8}Y_{0.2}O_{3-\delta}$—Ni, $BaCe_{0.6}Zr_{0.3}Y_{0.1}O_{3-\delta}$—Ni, and $BaCe_{0.8}Y_{0.2}O_{3-\delta}$—Ni, and the electrolyte layer is at least one of $BaCe_{0.7}Zr_{0.1}Y_{0.1}Yb_{0.1}O_{3-\delta}$-1.0 wt % NiO, $BaCe_{0.7}Zr_{0.1}Y_{0.1}Yb_{0.1}O_{3-\delta}$-1.0 wt % CoO, $BaCe_{0.7}Zr_{0.1}Y_{0.1}Yb_{0.1}O_{3-\delta}$-1.0 wt % CuO, $BaCe_{0.7}Zr_{0.1}Y_{0.1}Yb_{0.1}O_{3-\delta}$-1.0 wt % ZnO, $BaZr_{0.8}Y_{0.2}O_{3-\delta}$-1.0 wt % NiO, $BaZr_{0.8}Y_{0.2}O_{3-\delta}$-1.4 wt % CuO, $BaZr_{0.8}Y_{0.2}O_{3-\delta}$-1.0 wt % CoO, $BaZr_{0.8}Y_{0.2}O_{3-\delta}$-1.0 wt % ZnO, $BaCe_{0.6}Zr_{0.3}Y_{0.1}O_{3-\delta}$-1.3 wt % CuO, $BaCe_{0.6}Zr_{0.3}Y_{0.1}O_{3-\delta}$-1.0 wt % NiO, $BaCe_{0.6}Zr_{0.3}Y_{0.1}O_{3-\delta}$-1.0 wt % CoO, $BaCe_{0.6}Zr_{0.3}Y_{0.1}O_{3-\delta}$-1.0 wt % ZnO, $BaCe_{0.8}Y_{0.2}O_{3-\delta}$-1.0 wt % CoO, $BaCe_{0.8}Y_{0.2}O_{3-\delta}$-1.0 wt % NiO, $BaCe_{0.8}Y_{0.2}O_{3-\delta}$-1.0 wt % ZnO, and $BaCe_{0.8}Y_{0.2}O_{3-\delta}$-1.0 wt % CuO.

An aspect of the invention is the use of BCFZY0.1 for use at low temperatures (below about 500° C.) in a cathode in a low temperature SOFC. The activation energy of BCFZY0.1 can be less than about 80 kJ/mol. After more than about 1400 hours, there is no loss in performance as measured by the power output of the device. The material can also exhibit good low-temperature performance, for example, greater than about 970 mW/cm$^2$ at about 500° C. and 320 mW/cm$^2$ at about 400° C.

The oxygen nonstoichiometry variations and lattice expansion of perovskites can be suppressed by doping metal ions with relatively stable oxidation state in the B-site. Suitable materials include $Zr^{4+}$, $Ti^{4+}$, $Ce^{3+}$, $Ce^{4+}$, $Al^{3+}$, $Y^{3+}$, $Mg^{2+}$, $Ga^{3+}$, and $Nb^{5+}$. In some embodiments, the phase structure stability can also be increased. By way of example, Zr-doped $BaCo_{0.6}Fe_{0.4}O_{3-\delta}$ ($BaCo_{0.4}Fe_{0.4}Zr_{0.2}O_{3-\delta}$) has larger lattice parameter compared with BSCF because of substitution of $Co^{3+}$ by the larger $Zr^{4+}$. Larger lattice parameter can increase the free volume in the structure which can increase the oxygen ion mobility and decrease activation energy. In some embodiments, the lattice expansion rate with increasing temperature can also be lower than BSCF which leads to lower thermal expansion coefficients (TECs) and higher stability. Y and Zr co-doped $BaCo_{0.6}Fe_{0.4}O_{3-\delta}$ ($BaCo_{0.4}Fe_{0.4}Zr_{0.1}Y_xO_{3-\delta}$)[16] exhibits even higher lattice parameters compared to Zr-doped $BaCo_{0.6}Fe_{0.4}O_{3-\delta}$ because the size of $Y^{3+}$ is larger than $Zr^{4+}$. Furthermore, $Y_2O_3$ has lower bond dissociation energy compared to $ZrO_2$, which allows for the lower oxygen vacancy transport activation when substituting $Zr^{4+}$ with $Y^{3+}$.

An aspect of the invention is a SOFC comprising a BCFZY0.1 cathode.

The activation energy of the BCFZY0.1 can be between about 70 kJ/mol to about 110 kJ/mol, in some embodiments about 80 kJ/mol, over the temperature from about 300° C. to about 650° C. The activation energy can be between 10% and about 40%, in some embodiments, about 33% less than the activation energy of BSCF.

The BCFZY0.1 can be stable (i.e. maintain constant power over long term endurance testing) long term. By way of example, BCFZY0.1 can be stable for greater than about 1000 hours at 500° C. The resistance does not increase during this period. In comparison, the resistance of a comparable BSCF cathode can increase from about 65 Ωcm$^2$ to about 99.7 Ωcm$^2$ during 720 hours of testing under the same conditions.

The peak power density of the cell comprising the BCFZY0.1 can be between 0.13 W/cm$^2$ and about 0.97 W/cm$^2$ when the temperature increases between about 350° C. and 500° C.

The thickness of the BCFZY0.1 in a SOFC can be between about 5 μm and 30 μm.

The SOFC can be stable over thermal cycling (rapid temperature decrease and increase).

The performance (current density at constant voltage) does not degrade after more than 40 rapid (~20 degrees C./minute) thermal cycles between 500° C. and 240° C.

The cathode can be provided for the SOFC in the same manner as the cathode is applied for PCFC. Suitable methods include the sol-gel method. Calculated amount of Ba(NO$_3$) (Alfa Aesar), Co(NO$_3$)$_2$.6H$_2$O (Alfa Aesar), Fe(NO$_3$)$_3$.9H$_2$O (Alfa Aesar), ZrO(NO$_3$)$_2$ 35 wt. % in dilute nitic acid (Sigma Aldrich), Y(NO$_3$)$_3$.6H$_2$O (Alfa Aesar), EDTA (Alfa Aesar) and Citric Acid (Alfa Aesar) can be dissolved in ammonia hydroxide with continuous heating at temperatures between about 60° C. and about 95° C. The mixture can be continuously stirred using any suitable method. Water in the mixture can be evaporated at a temperature between about 60° C. and about 95° C. to obtain a gel (typically dark purple). The gel can be heated to a temperature of between about 120° C. and about 180° C., in some embodiments about 150° C. for between about 10 hours and about 36 hours, in some embodiments about 24 hours to produce a charcoal. The charcoal can be porous. The charcoal can be milled, using for example a low energy ball mill, high energy ball mill, or manually pestle and mortar grinding, and mixed with a solvent, for example n-butanol, isopropanol, ethanol, acetone, methanol, and toluene, for between about 24 hours and about 72 hours, in some embodiments about 48 hours. The powder can be dried at a temperature between about 100° C. and about 250° C., in some embodiments about 170° C., for between about 5 hours to about 10 hours, in some embodiments for about 8 hours. The powder can be calcined at a temperature between about 400° C. and about 800° C., in some embodiments about 600° C., for between about 3 hours and about 10 hours, in some embodiments about 5 hours. The calcined powder can be milled again with a solvent for between about 24 hours and about 72 hours, in some embodiments about 48 hours and dried at a temperature between about 120° C. and about 250° C., in some embodiments about 170° C., for between about 5 hours and about 10 hours, in some embodiments about 8 hours, to obtain the cathode powder.

The cathode powder, for example BSCF, BCFZ, and BCFZY0.1, can be made into a gel or paste by mixing the powder with 20 wt % solsperse 28000 dissolved in terpinol and 5 wt % V-006 dissolved in terpinol. The gel or paste can then be painted, dipped, sprayed, screen printed, spray coated, tape casted, or slot die coated onto the substrate. An electrolyte layer can be added to the substrate to produce the fuel cell. Suitable substrates include, but are not limited to electrolyte pellets (SDC, GDC, YSZ, and LSGM) and anode supported electrolyte half cells (Ni-SDC/SDC, Ni-GDC/GDC, Ni-YSZ/YSZ, and Ni-LSGM/LSGM). Suitable electrolytes include, but are not limited to, SDC, GDC, YSZ, and LSGM. An anode layer can be added to the substrate to produce the fuel cell. Suitable anode materials include, but are not limited to, Ni-SDC, Ni-GDC, Ni-YSZ, and Ni-LSGM.

After the cathode is added to the substrate to produce the fuel cell, the cell (which can include the anode and/or the electrolyte) can be sintered at a temperature of between about 700° C. and about 1000° C., in some embodiments about 5 hours, for between about 2 hours and about 10 hours, in some embodiments about 5 hours.

Figure 1B:
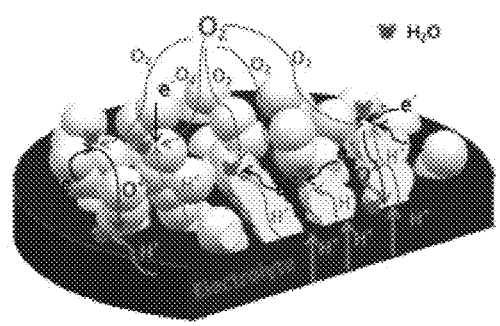
FIG. 1B is a schematic of the oxygen reduction reaction mechanism for a PCFC with a triple conducting oxide cathode.

Referring now to the Figures, FIGS. 1A-1B shows schematic diagrams of a cathode of the prior art and cathode of the present invention. More specifically, FIGS. 1A-1B shows the oxygen reduction mechanism for a PCFC between (a) a mixed ionic and electronic (MIEC) cathode (conventional SOFC cathode) and (b) a triple (electron, oxygen ion, and proton) conducting oxide cathode of the present invention. Without wishing to be bound to any theory, it is believed the poor performance of the conventional PCFC devices are attributed, in part, to their use of cathodes that were developed for SOFCs operating at much higher temperatures (i.e., 700° C. to 1000° C.), whereas target PCFC operation temperatures are lower (i.e.,~500° C.).

As shown in FIG. 1, the application of the conventional SOFC cathodes, which are often based on either electron-conducting oxides or mixed oxygen ion and electron-conducting oxides, to PCFC electrolytes restricts the cathode reaction to points where the electrolyte and electrode phases meet. By contrast, the triple-conducting oxide cathode eliminates the triple-phase boundary constraints associated with traditional composite cathode architectures. As a result, the entire cathode becomes electrochemically active, offering the chance to lower the viable operating window of PCFC devices to <400° C., compared to conventional devices with a viable operating window of >700° C.

All publications, patents, and patent documents cited herein are incorporated by reference herein, as though individually incorporated by reference. The invention has been described with reference to various specific and preferred embodiments and techniques. However, it should be understood that many variations and modifications may be made while remaining within the spirit and scope of the invention.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any sub-combination.

This invention now being generally described will be more readily understood by reference to the following examples, which are included merely for the purposes of illustration of certain aspects of the embodiments of the invention. The examples are not intended to limit the invention, as one of skill in the art would recognize from the above teachings and the following examples that other techniques and methods can satisfy the claims and can be employed without departing from the scope of the claimed invention.

EXAMPLES

Example 1

Characterization of Cathode

Preparation of Cathode Powder

Powders of BCFZY were synthesized from nitrates of the component metals via a method of combining EDTA acid and citric complexes. In brief, the calculated amounts of nitrates were dissolved in EDTA-NH$_3$.H$_2$O (NH$_3$.H$_2$O, 8 mol L$^{-1}$; EDTA: NH$_3$.H$_2$O=1 g, 10 ml) solution under heating and stirring. Citric acid was then introduced with a molar ratio of EDTA acid: citric acid: total metal ions controlled to be around 1.5:1.5:1. Subsequently, NH$_3$.H$_2$O or HNO$_3$ was added to adjust the pH value to around 9, immediately making the solution transparent. By evaporating the water, a dark purple gel was obtained. The gel was then heated to high temperature to burn in order to get the primary powder, which was then calcined at 1000° C. for 5 hours to obtain a final phase-pure powder of the desired composition.

Powders of BCFZY0.1 were also synthesized by the traditional sol-gel method without burn, but brought the gel to 150° C. for 24 hours to get the primary powder, which was then calcined at 1000° C. for five hours to obtain a final phase-pure powder of the desired composition. For the optimized procedure, powders of BCFZY0.1 were first synthesized by the traditional sol-gel method. The powder is then brought to 150° C. for 24 hours before being ball milled with butanol as a solvent for 48 hours. Then, the powder was dried at 90° C. for 24 hours. Finally, the powder is calcined at 600° C. for five hours to obtain a final powder, which will be used in a slurry.

Preparation of Cathode Solution

To prepare the active BCFZY0.1 cathode coating, stoichiometric amounts of the respective metal nitrates (0.05 mol total metal ion concentration) are dissolved in 90 mL deionized water. Then, 0.75 mol of citric acid is added as a complexing agent to facilitate the homogeneous distribution of the componential metal ions. In order to improve the solubility of precursors, 10 mL 25 wt. % $NH_3 \cdot H_2O$ is added. Typically, 10 μL of this BCFZY0.1 solution is infiltrated into the pores of the cathode bone structure under vacuum using a microliter syringe to control the loading amount. The infiltrated cells are fired at 400° C. for 1 h. The above process is repeated two more times and finally the cells are sintered at 900° C. for 5 h to obtain the desired nano crystalline phase of BCFZY0.1.

Preparation of Cathode Pellet for TGA Measurement

The as-synthesized sol-gel BCFZY0.1 powder was calcined at 900° C. for 10 hours then pressed into pellets in a carbonized stainless steel die set with diameter of 12.5 mm using 375 MPa for 120 s. The final dense pellets with diameter of about 9-11 mm and thickness of 0.5-1.0 mm were obtained after sintering at 1120° C. for 5 hours.

TGA Experimental Protocol for Protonation and Deprotonation Measurement

The TGA experiments were carried out as follows: 1) Heat to 500° C. at 10° C. $min^{-1}$ in a dry environment of 20 mL $min^{-1}$ air and 83 mL $min^{-1}$ UHP nitrogen. Final $p_{O2}$=4.3%/Final $p_{H2O}$=0.04% (dew point of −35° C.). 2) Hold in dry environment of 20 mL $min^{-1}$ air and 83 $mLmin^{-1}$ UHP nitrogen for 33 minutes. The results of the TGA experiments will be discussed with reference to Example 2 and FIGS. 10A-10D.

Characterization Results

X-ray diffraction (XRD) analyses of the cathode powders were performed at room temperature using a Philips diffractometer (X'Pert Pro) with Cu-Ka radiation, tube voltage 45 kV, and tube current 40 mA. Intensities were collected in the 2 theta range between 10° and 120° with a step size of 0.008° and a measuring time of 5 s at each step. The microstructure and chemical composition of the sintered pellets were investigated by means of Field Emission Scanning Electron Microscopy (FESEM, JEOL JSM7000F).

Figure 2A:
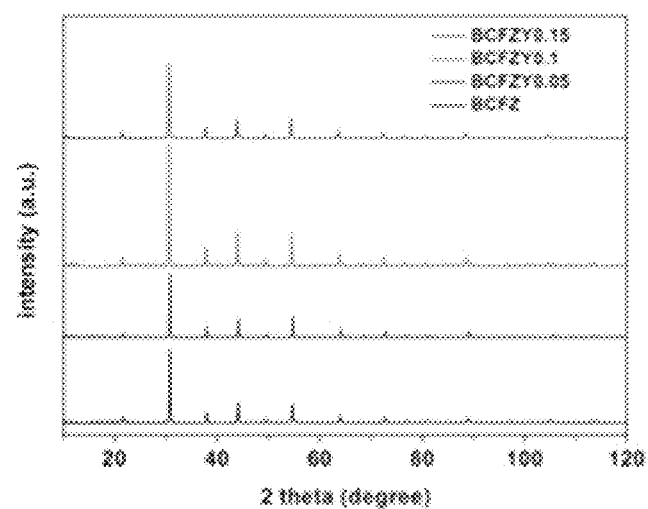
FIG. 2A is a plot of a XRD pattern of $BaCo_{0.4}Fe_{0.4}Zr_{0.2-x}Y_xO_{3-\delta}$ where x is between 0 and 0.15, where 2 theta is between about 10 and about 120.
Figure 2B:
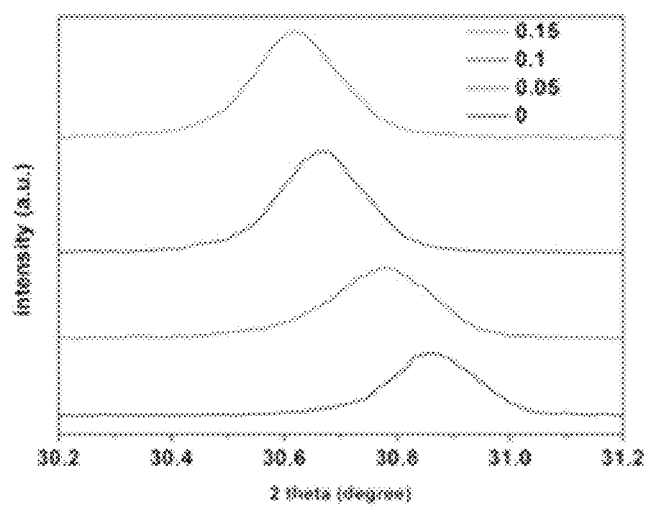
FIG. 2B is a plot of a XRD pattern of $BaCo_{0.4}Fe_{0.4}Zr_{0.2-x}Y_xO_{3-\delta}$ where x is between 0 and 0.15, where 2 theta is between about 30.2 and about 31.2.

FIGS. 2(a) and 2(b) show XRD patterns of BCFZY having x values of 0, 0.05, 0.1, and 0.15, which were prepared by the sol-combustion method and calcined at 1000° C. for five hours. As shown in FIG. 2A, a single cubic perovskite structure was formed for all samples, demonstrating that BCFZY can be stabilized to the cubic phase by B-site doping with Y lower than 15 mol %. For the compositions that retained the cubic perovskite structure, no impurities were detected beyond the baseline noise level, indicating a high level of crystalline phase purity. FIG. 2B shows an enlarged view of peaks present in the XRD pattern at around 30 degrees. As shown, the XRD peaks shift gradually to lower angles as the yttrium doping level increases from x=0 to x=0.15, indicating an increased lattice parameter with yttrium doping. This is understood by considering the larger size of yttrium ions ($^{VI}r_{Y3+}$=0.90 Å) compared to that of zirconate ions ($^{VI}r_{Zr4+}$=0.72 Å). Given the lack of impurities observed in the XRD patterns, even with larger amounts of yttrium doping, it seems likely that at least the majority of the yttrium has been incorporated into the perovskite structure.

Figure 3:
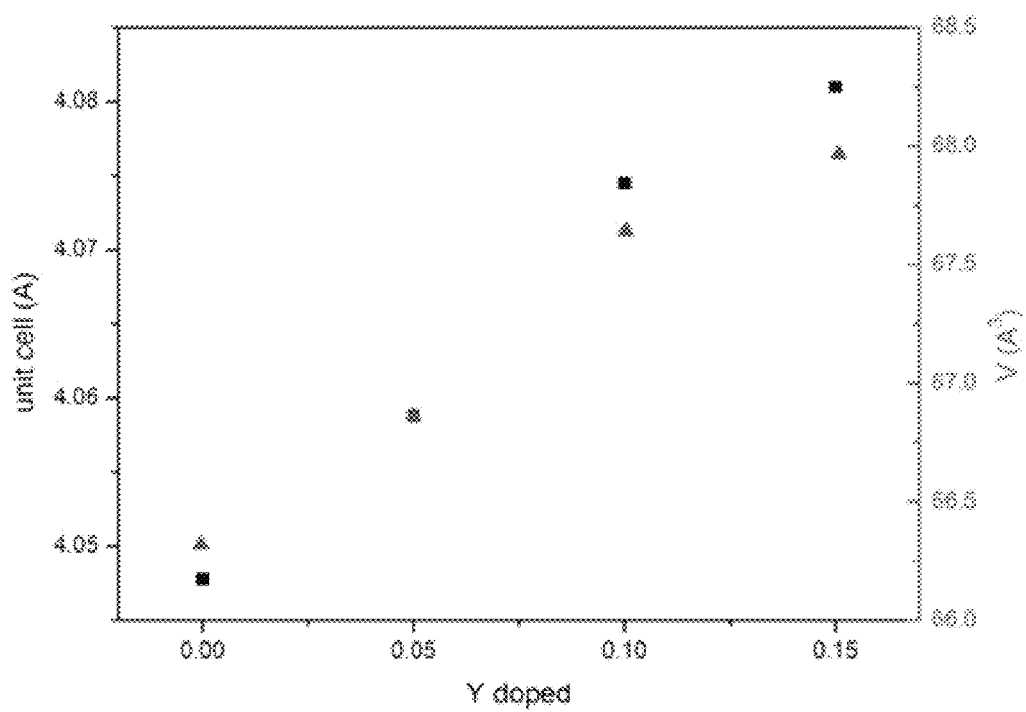
FIG. 3 is a plot of the analysis of the lattice parameters between the yttrium content and an average unit cell size and volume of the $BaCo_{0.4}Fe_{0.4}Zr_{0.2-x}Y_xO_{3-\delta}$ crystals.

FIG. 3 shows an analysis of the lattice parameters between the yttrium content and an average unit cell size and volume of the crystals. As shown, an increasing linear correlation exists between the yttrium content and the average unit cell size of the crystals. Thus, the incorporation of yttrium, having a larger ionic radius, on the B-site would be expected to increase the average unite cell size and volume of the crystal, as observed.

Figure 4:
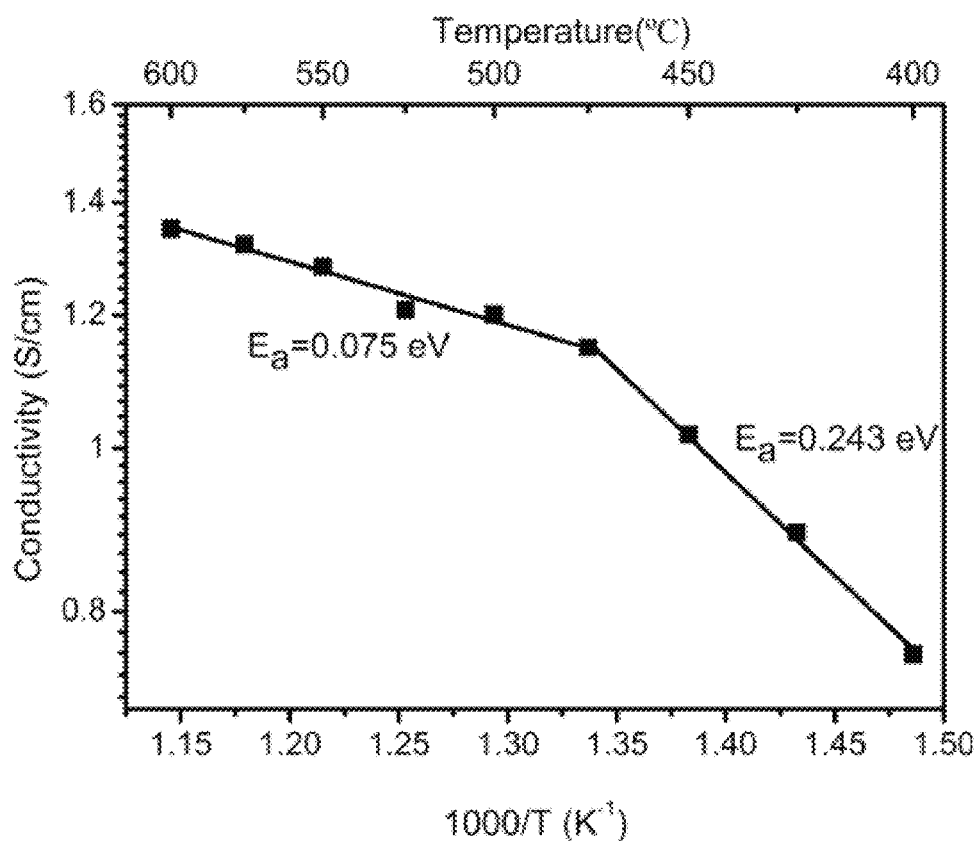
FIG. 4 is a plot of the DC conductivity for $BaCo_{0.4}Fe_{0.4}Zr_{0.1}Y_{0.1}O_{3-\delta}$ in humidified air.

FIG. 4 shows the DC conductivity of BCFZY0.1 in humidified air measured by the 4-probe DC measurement method. As shown, BCFZY0.1 exhibits electrical conductivities in a range of 0.5-1.4 S·$cm^{-1}$ at temperatures between 400° C.-600° C. This range of electrical conductivities ensures the high performance of the cathode reaction. Moreover, the low activation energies of 0.075 eV and 0.243 eV indicate the large contribution made to electron conductivity.

Example 2

Symmetric Cells

Preparation of Cells

Symmetrical cells with the configuration of electrode-|electrolyte|electrode were prepared as described below. Proton conducting ceramic pellets of BCZYYb were synthesized by the solid-state reactive sintering (SSRS) method from the cost-effective raw oxides. Dense BCZYYb-1.0 wt % NiO pellets of 15 mm in diameter and 2 mm in thickness were prepared by dry pressing under 375 MPa pressure for 120 s and were subsequently sintered in air at 1350° C. for 24 hours. The BCFZY (burned and sol-gel) cathode powders (5 g) were first dispersed in a mixed solution of glycerol (3 mL), ethylene glycol (10 mL) and isopropyl alcohol (50 mL) to form a colloidal suspension via high-energy ball milling for 24 hours. The obtained slurries were spray-coated symmetrically on both surfaces of the BCZYYb-1.0 wt % NiO pellets, followed by calcination at 1100° C. for 5 hours in stagnant air. For the optimized BCFZY0.1 cathode, the final calcination temperature is 950° C. Silver mesh and gold wire was attached to the electrode surfaces using gold paste as the current collector by sintering in air at 900° C. for 1 hour.

Testing

Electrochemical impedance spectroscopy (EIS) of symmetrical cells was performed with a Gamry Reference 600 Potentiostat/Galvanostat/ZRA using a signal amplitude of 10 mV under open circuit voltage (OCV) conditions in the frequency range of 0.01-$10^6$ Hz. EIS was conducted under 21% $O_2$ by mixing oxygen with Ar using flow meters. The symmetrical cell tests were performed in wet atmospheres ($P_{(H2O)}$=0.03 atm).

Results

Figure 5A:
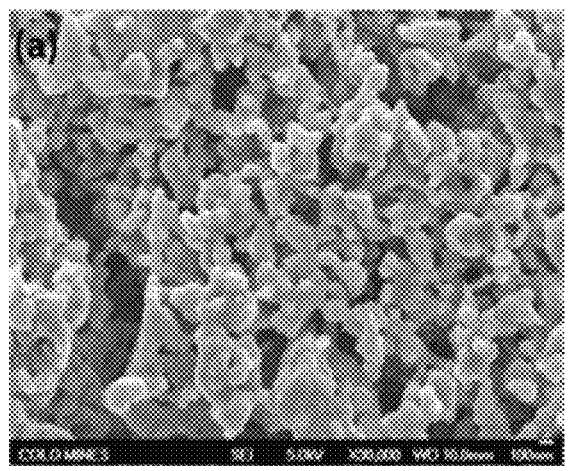
FIG. 5A is a SEM image of the cross-section of a BCFZ cathode layer.
Figure 5B:
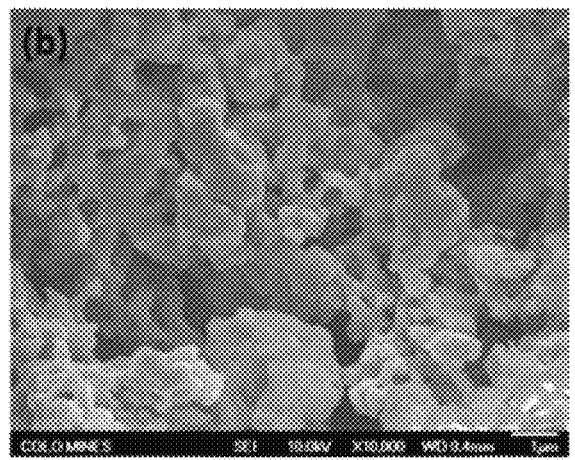
FIG. 5B is a SEM image of the cross-section of a $BaCo_{0.4}Fe_{0.4}Zr_{0.1}Y_{0.1}Y_{3-\delta}$ cathode layer.

FIGS. 5A and 5B show SEM images of the cross sections for cathode films spray-coated on BCZYYb-1.0 wt % NiO electrolyte membrane after annealing at 1100° C. with BCFZ (FIG. 5A) and BCFZY0.1 (FIG. 5B) as cathode materials. As shown, the microstructures of BCFZ and BCFZY0.1 show a number of differences. As can be seen in FIG. 5A, BCFZ has a very porous morphology and nano-sized grains. By contrast, as shown in FIG. 5B, BCFZY0.1 has a relatively dense morphology and larger grains.

Figure 6:
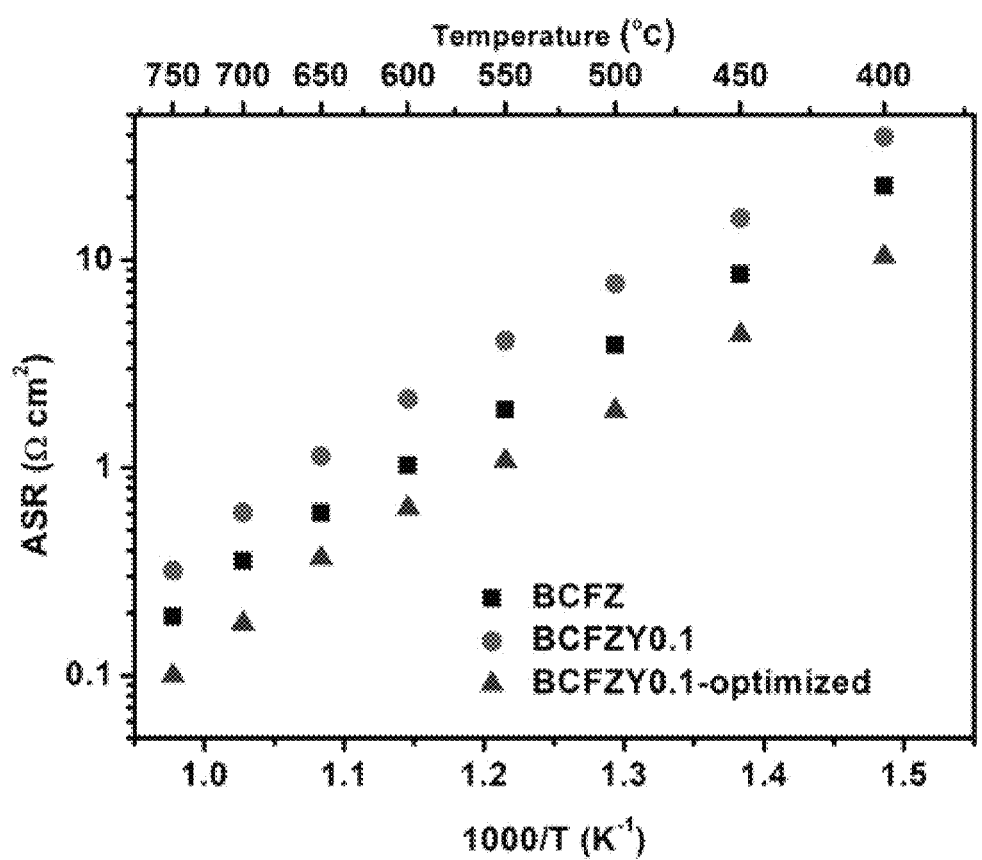
FIG. 6 is a plot of ASR values for the $BaCo_{0.4}Fe_{0.4}Zr_{0.1}Y_{0.1}Y_{3-\delta}$ porous thin film cathode and BCFZ porous thin film cathode.

FIG. 6 shows ASR values for the BCFZY0.1 and BCFZ porous thin film cathodes based on symmetric cells in Arrhenius plots as a function of temperature. As shown, the ASR for the BCFZY0.1 cathode is higher than that of the BCFZ cathode. Without wishing to be bound to any theory, the larger ASR values for the BCFZY0.1 as compared with the ASR values for BCFZ likely correlates to the difference in microstructure, namely, that BCFZY0.1 is relatively dense and has larger grains than BCFZ.

Figure 7A:
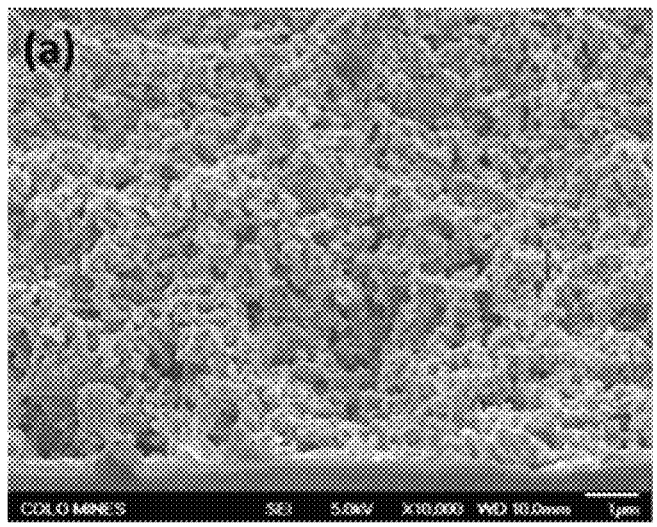
FIG. 7A is a SEM image of the cross-section of the resulting cathode layer for BCFZ.
Figure 7B:
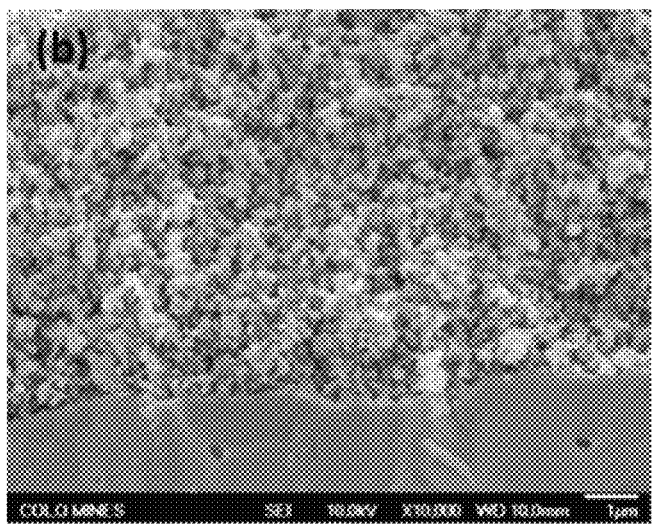
FIG. 7B is a SEM image of the cross-section of an optimized $BaCo_{0.4}Fe_{0.4}Zr_{0.1}Y_{0.1}O_{3-\delta}$.

FIGS. 7A and 7B show SEM images of the cross-section of the resulting BCFZ cathode layer and BCFZY0.1 cathode layer, respectively. More specifically, FIG. 7B shows the BCFZY0.1 cathode layer which was fabricated at an annealing temperature of 900° C. to obtain a similar morphology as the BCFZ morphology shown in FIG. 7A. By comparing the ASRs for BCFZ cathode and BCFZY0.1 cathode with the same morphology, it is demonstrated that the existence of yttrium greatly improves the cathode performance by lowering ASR and activation energy, which is consistent with predictions by structural analysis.

Figure 8A:
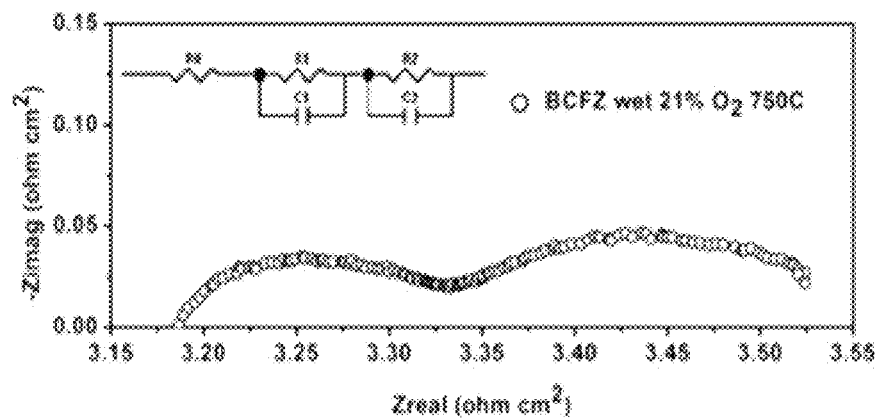
FIG. 8A is a plot of the typical impedance spectra of symmetrical cells with BCFZ.
Figure 8B:
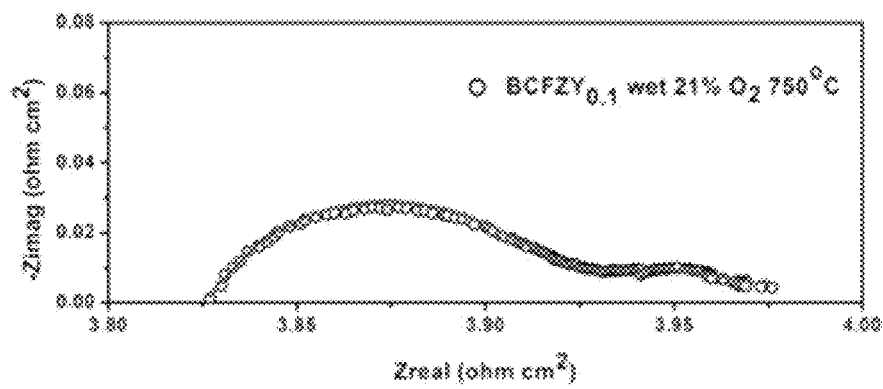
FIG. 8B is a plot of the typical impedance spectra of the optimized $BaCo_{0.4}Fe_{0.4}Zr_{0.1}Y_{0.1}O_{3-\delta}$.

FIGS. 8A and 8B show the typical impedance spectrum at a temperature of 750° C. of a symmetrical cell with a BCFZ cathode (sintered at 1100° C.) and an optimized BCFZY0.1 cathode. With respect to FIG. 8A, the process related to R1 may originate from the proton diffusion at the interface between the BCFZ cathode and the BCZYYb electrolyte. The process related to R2 may originate from the diffusion of $O^-_{ad}$ ($O^-_{ad}$-$O^-_{TPB}$). By contrast, as shown in FIG. 8B, the optimized BCFZY0.1 cathode has a much smaller R2 resistance under the same analytical conditions, which demonstrates that the Y doping in the BCFZ structure could increase the size and volume of the structure leading to a further increase in oxygen vacancies and oxygen ionic transportation.

Figure 9:
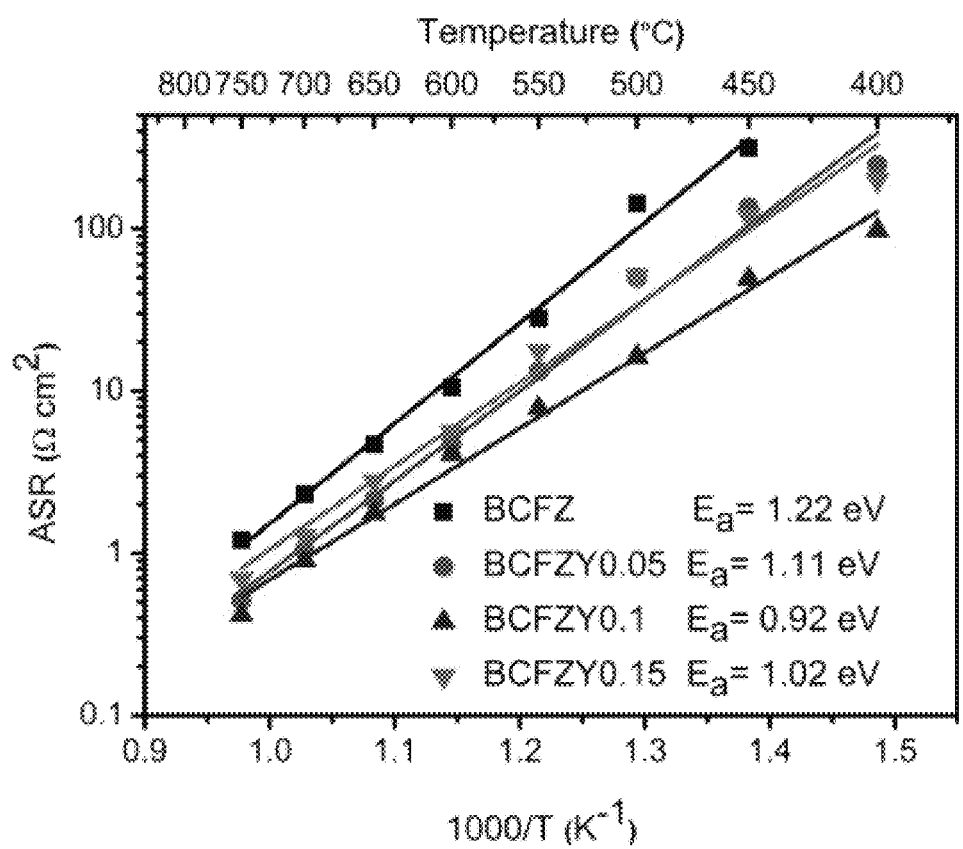
FIG. 9 is a plot of the cathode ASR values for a BCFZY|BCZYYb|BCFZY symmetric cell in an Arrhenius diagram as a function of temperature for various concentrations of yttrium doping.

After the porous thin film cathodes with equivalent microstructure were fabricated, the characterization of the intrinsic effect of yttrium amount in the perovskite structure was performed by measuring ASR values for symmetric cells based on the electrolyte of BCZYYb+1.0 wt % NiO and symmetric cathode of $BaCo_{0.4}Fe_{0.4}Zr_{0.2-x}Y_xO_{3-\delta}$ (x=0-0.15). FIG. 9 shows the cathode ASR values for a series of BCFZY symmetric cells (with varying Y-doping concentration) in an Arrhenius diagram as a function of temperature. The BCFZY0.1 cathode yields the lowest ASR values (best performance). As temperature decreases, the ASR of all samples increases. Activation energies extracted from the cathode ASR data via the Arrhenius equation yield significantly lower values for the BCFZY0.1 cathode compared to the other cathode compositions.

Figure 10A:
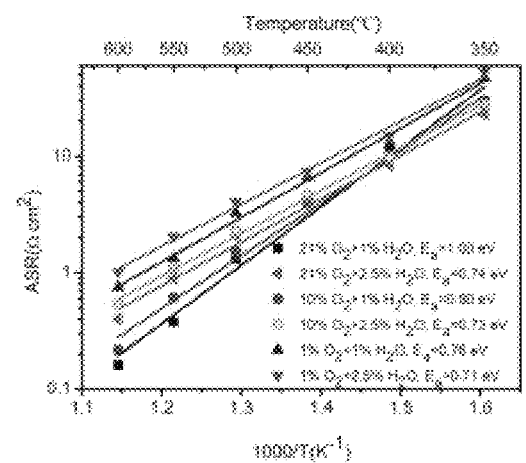
FIG. 10A is a plot illustrating the cathode ASR values for the optimized $BaCo_{0.4}Fe_{0.4}Zr_{0.1}Y_{0.1}O_{3-\delta}$ symmetric cell under various atmospheres.
Figure 10B:
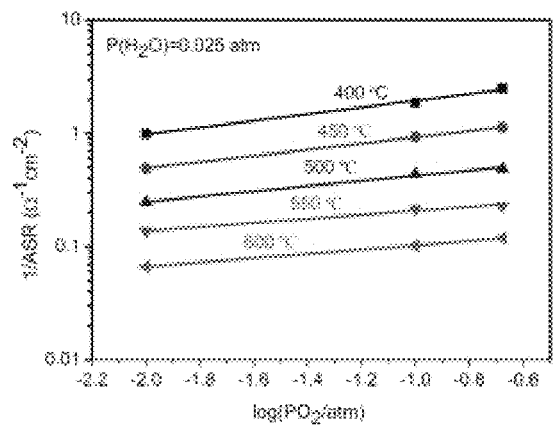
FIG. 10B is a plot illustrating the cathode 1/ASR values under various $P(O_2)$ at $P(H_2O)=0.025$ atm.
Figure 10C:
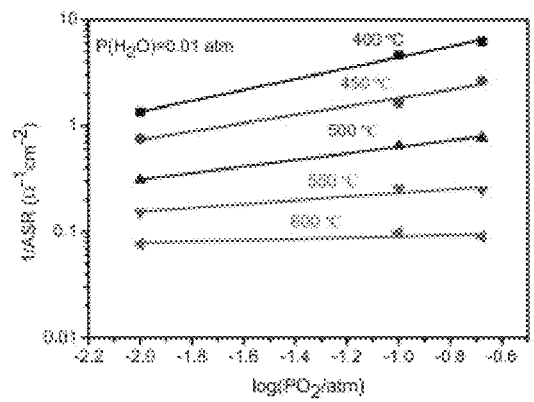
FIG. 10C is a plot illustrating cathode the 1/ASR values under various $P(O_2)$ at $P(H_2O)=0.01$ atm.
Figure 10D:
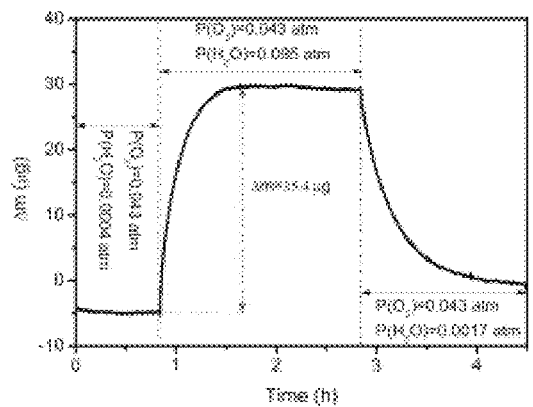
FIG. 10D is a plot illustrating the cathode protonation and deprotonation profile measured by thermogravimetric analysis.

FIGS. 10A-10C are related to the ORR mechanism on representative BCFZY0.1 cathode in symmetric cells. FIG. 10A shows the BCFZY0.1 symmetric cell ASR under different atmospheres from 350° C. to 600° C. The activation energy increases with increasing oxygen partial pressure, but decreases with increasing water partial pressure, which is indirect evidence for proton conduction in BCFZY0.1. FIGS. 10B and 10C show the cathode 1/ASR values under various pot at $p_{H2O}$=0.025 atm and 0.01 atm, respectively. Standard defect reaction and mass action laws can be applied to describe the likely defect reaction equilibria in BCFZY. Using Kroger-Vink notation, proton uptake by water incorporation can be described via:

$$H_2O + V''_O + O^X_O \leftrightarrow 2OH'_O, \quad (1)$$

$$K_w = \frac{[OH'_O]^2}{[V''_O]p_{H_2O}}$$

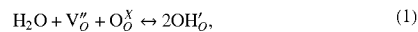

-continued $$[OH'_O] = K_w^{1/2}[V''_O]^{1/2}p_{H_2O}^{1/2} \quad (2)$$

where $K_W$ is the equilibrium constant for water incorporation (Wagner hydration). Equation (2) thus describes the predicted variation in proton concentration as a function of $K_w$, the external $p_{H2O}$, and the oxygen vacancy concentration. For oxidation, we have:

$$\frac{1}{2}O_2 + V''_O \leftrightarrow 2h^{\cdot} + O^X_O, \quad (3)$$

$$K_O = \frac{p^2}{[V''_O]p_{O_2}^{1/2}}$$

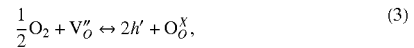

$$p = K_O^{1/2}[V''_O]^{1/2}p_{O_2}^{1/4} \quad (4)$$

where $K_O$ is the equilibrium constant for the oxidation reaction. Equation (4) thus describes the variation in oxygen vacancy concentration as a function of $K_O$, the external $P_{O2}$, and the concentration of holes (which increase with increasing oxygen partial pressure at fixed temperature). For a majority hole conductor (such as BCFZY), $\sigma_{total}$ will be dominated by the hole conductivity, which as shown in Equation 4 is proportional to $p_{O_2}^{1/4}$ at constant water partial pressure.

FIGS. 10B and 10C further show 1/ASR vs $\log(p_{O2})$, the slope of which may indicate a cathode reaction process limited by the hole-dominated conductivity of the cathode. Under wet conditions ($p_{H2O}$=0.025 atm), all curves are very close to ¼ slope, but under drier conditions ($p_{H2O}$=0.01 atm) the slope varies from almost zero at high temperature to~½ at low temperature, potentially indicating a change in the rate-limiting reaction step with T under dry conditions.

However, the results of the ASR data provide only indirect evidence for proton uptake in BCFZY0.1. Strong and direct evidence can be found by referring to the results of the TGA experiment performed in Example 1, shown in FIG. 10D. As shown, upon a sudden stepwise increase in $p_{H2O}$ under constant $p_{O2}$, BCFZY0.1 experiences an increase in mass. This mass change can be ascribed to either the hydration or hydrogenation reactions shown in equations 5 and 6 (or a combination of the two). Accordingly, these reactions give the low and high limits respectively to the likely proton uptake in BCFZY0.1. Based on mass increase measured for BCFZY0.1 in FIG. 10D, the low and high proton concentration limits at 500° C. and 0.95% $p_{H2O}$ are calculated to be 0.21% mol H+/mol BCFZY0.1 and 1.9% mol H+/mol BCFZY0.1, respectively.

Thus, the preliminary TGA study here confirms that BCFZY0.1 shows comparable, if not slightly higher proton uptake than the previously reported BSFZ triple conducting oxide. Considering the larger lattice constant of BCFZY0.1 compared to BSFZ and the relatively symmetric cubic perovskite structure, it is likely that proton mobility will also be higher in BCFZY0.1, consistent with the low activation energies for BCFZY0.1 obtained from symmetric cell measurements in moist atmospheres.

Example 3

Anode-Supported PCFC Single Cells

Optimized cathode compositions of BCFZY0.1 were applied as porous thin film cathode and active nanoparticle cathode in proton conducting cathode bone for button-type PCFC singles under $H_2$/air and $CH_4$/air gradients.

Preparation

Precursor pastes of the electrolyte and cathode bone were prepared by mixing 30 g of the respective powders with 6 g dispersant (20 wt. % solsperse 28000 (Lubrizol) dissolved in terpinol), and 2 g binder (5 wt. % V-006 (Heraeus) dissolved in terpinol). The anode precursor powder was dry-pressed under 375 MPa for 2 minutes in a circular carbon-aided steel die set with a diameter of 19 mm to produce green anode pellets (2 mm thick). A thin electrolyte precursor paste layer (15~50 μm after firing) was deposited on each side of the green anode pellets by screen-printing. (The electrolyte was applied to both sides of the cell to minimize asymmetric stress issues during sintering.) The cathode bone precursor paste layer (~10-50 μm thick after firing) was subsequently printed on top of one of the electrolyte precursor layers. The complete structure is fired at 1400° C. for 18 hours. After firing, the extra electrolyte layer is removed by grinding and a complete single cell (porous anode|dense electrolyte-|porous cathode bone) is obtained. In order to further improve cathode performance, active nanoparticles of the BCFZY phase were introduced by infiltration and subsequent heat treatment at 900° C. for 5 hours.

The anode green pellets fabrication and electrolyte layer deposition method was analogous to the half SSRS method. This "half-cell" anode/electrolyte structure was then fired at 1400-1450° C. for 18 hours. After firing, the extra (stress-compensating) electrolyte layer was removed by grinding and the active cathode (~10-20 μm thick) was printed on the electrolyte and the cell was fired at 900° C. for 5 hours. After that, a complete single cell (porous anode|dense electrolyte |porous cathode) is obtained.

Testing

Once the anode-supported PCFC single cells were obtained, hydrogen-fueled and methane-fueled single cell testing was performed. Regarding the hydrogen-fueled testing, I-V polarization tests of the PCFC button cells (sealed onto an alumina tube and reduced under 5 vol. % $H_2$ for 24 hours and 10 vol. % $H_2$ for another 24 hours at 600° C.) were performed with 100 mL·min$^{-1}$ air and 20 mL·min$^{-1}$ hydrogen as oxidant and fuel respectively by a Gamry Reference 3000 over a range of temperatures from 350°-600° C.

Regarding the methane-fueled testing, all the PCFC button cells for testing in methane were infiltrated with a 10 μL 1.5 wt. % N4O10Ru (Ruthenium nitrosyl nitrate) solution into the porous anode prior to coating the cathode layer at 900° C. I-V polarization tests of all the cells were performed with 100 mL·min$^{-1}$ (STP) air as oxidant and 20 vol. % $CH_4$ (10 mL .min$^{-1}$)+30 vol. % Ar +50 vol. % $H_2O$ or 28.6 vol. % $CH_4$ (5 mL·min$^{-1}$)+71.4 vol. % $H_2O$ as fuel by a Gamry Reference 3000 over a range of temperatures from 350°-600° C.

Results

Figure 11A:
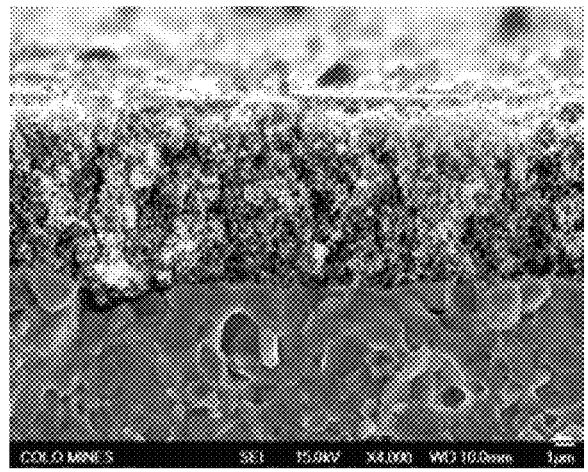
FIG. 11A is a SEM image illustrating the interface between BZY20+1.4 wt % CuO electrolyte and $BaCo_{0.4}Fe_{0.4}Zr_{0.1}Y_{0.1}O_{3-\delta}$ thin film cathode layer.
Figure 11B:
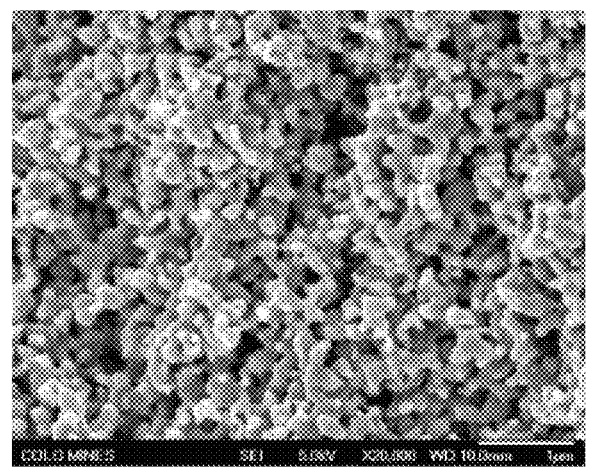
FIG. 11B is a SEM image illustrating a high magnification view of the cathode layer for a PCFC single cell of 45 wt % BZY20+55 wt % NiO|BZY20+1.4 wt % CuO|$BaCo_{0.4}Fe_{0.4}Zr_{0.1}Y_{0.1}Y_{3-\delta}$ after 1400 hours of operation under $CH_4$/air.

FIGS. 11A and 11B shows the SEM images for the interface between BZY20+1.4 wt % CuO electrolyte and BCFZY0.1 thin film cathode layer and the SEM image of the high magnification view of the cathode layer for PCFC single cell of 45 wt % BZY20+55 wt % NiO|BZY20+1.4 wt % CuO|BCFZY0.1 after 1400 hours operation under $CH_4$/air. It is clear the very porous nanostructure with BCFZY0.1 grain size less than 100nm was maintained for more than 1400 hours of operation, which indicates the great morphological stability of the cathode material.

Figure 12A:
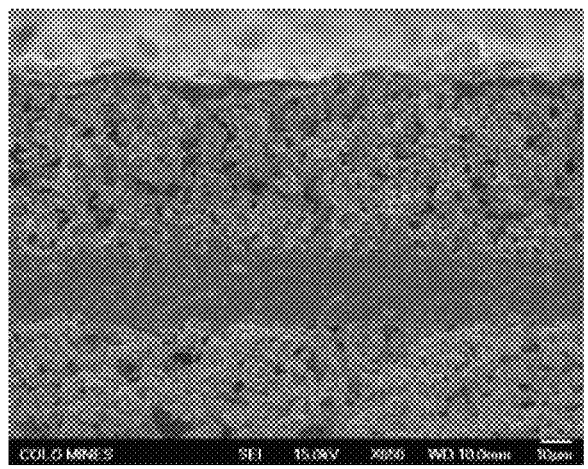
FIG. 12A is an image of a cross section and a high magnification image of a composite cathode microstructure fabricated by infiltration method for PCFC single cell of 45 wt % BCZYYb+55 wt % NiO|BCZYYb+1.0 wt % NiO|BCZY63+$BaCo_{0.4}Fe_{0.4}Zr_{0.1}Y_{0.1}O_{3-\delta}$.
Figure 12B:
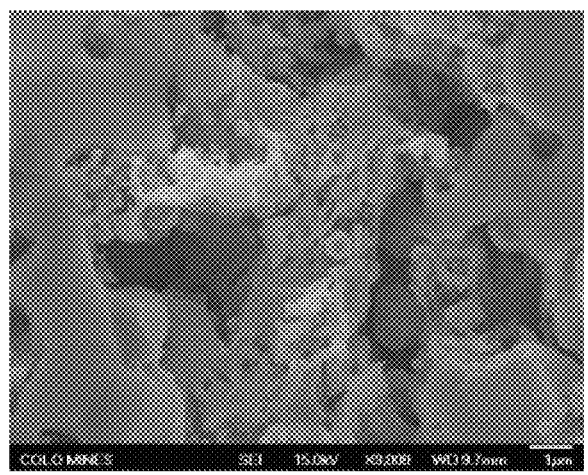
FIG. 12B is an image of a cross section and a high magnification image of a composite cathode microstructure fabricated by infiltration method for PCFC single cell of 45 wt % BCZYYb+55 wt % NiO|BCZYYb+1.0 wt % NiO|BCZY63+$BaCo_{0.4}Fe_{0.4}Zr_{0.1}Y_{0.1}O_{3-\delta}$.

FIGS. 12A and 12B shows the SEM images of the composite cathode microstructure fabricated by infiltration method for PCFC single cell of 45 wt % BCZYYb+55 wt % NiO|BCZYYb+1.0 wt % NiO|BCZY63+BCFZY0.1. It is clear that the nanoparticles of BCFZY0.1 were successfully deposited on the wall of the porous BCZY63 cathode bone.

Figure 13:
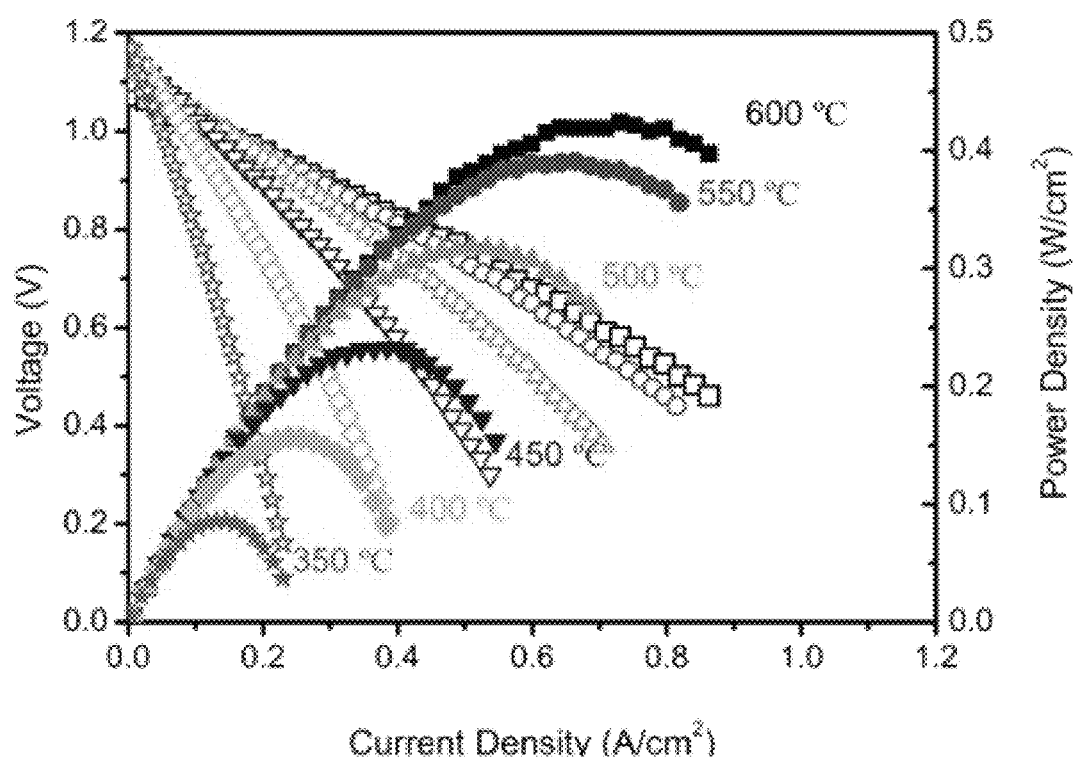
FIG. 13 is a plot of IV curves and corresponding power densities of a PCFC single cell of 40 wt % BCZY63+60 wt % NiO|BCZY63+1.3 wt % CuO|$BaCo_{0.4}Fe_{0.4}Zr_{0.1}Y_{0.1}Y_{3-\delta}$ between 350° C.-600° C. under $H_2$/air operation.

FIG. 13 shows the I-V curves and the corresponding powder densities of a 40 wt. % BCZY63+60 wt. % NiO|BCZY63+1.3 wt. % CuO|BCFZY0.1 cell at 350°-600° C. under $H_2$/Air operation. It is clear that by using the BCFZY0.1 thin film cathode excellent power densities were obtained for PCFC single cells at the low operation temperature range of 350-600° C. under $H_2$/air gradient.

Figure 14:
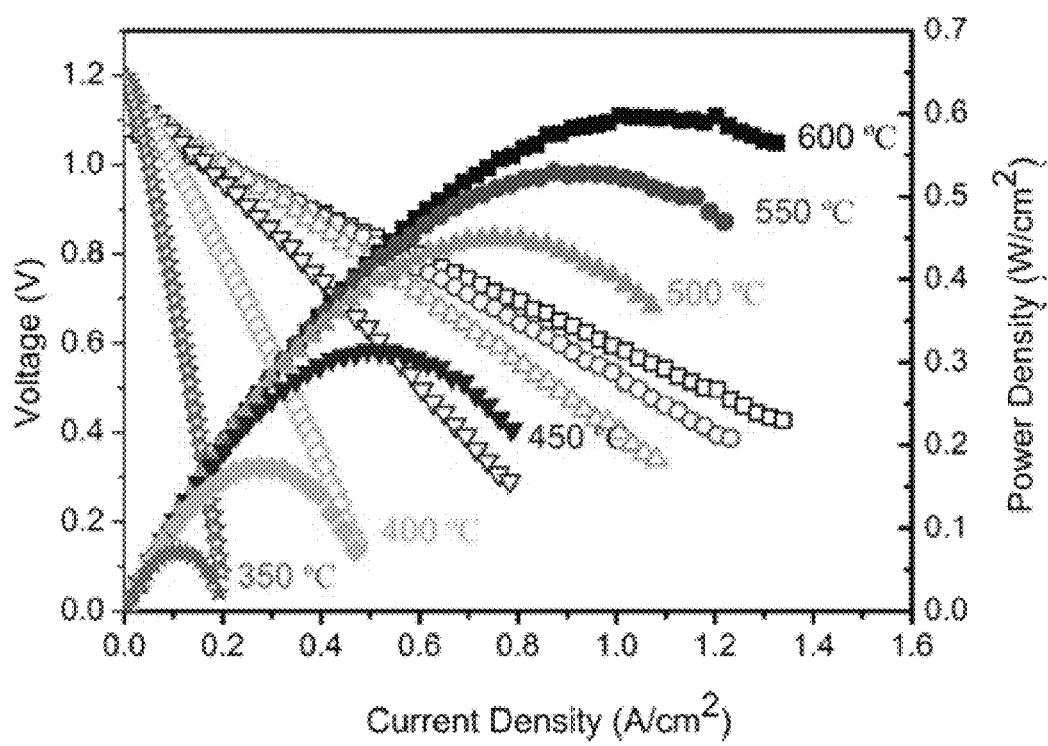
FIG. 14 is a plot of IV curves and corresponding power densities of a PCFC single cell of 40 wt % BCZYYb+60 wt % NiO|BCZYYB+1.0 wt % NiO|BCZY63+$BaCo_{0.4}Fe_{0.4}Zr_{0.1}Y_{0.1}O_{3-\delta}$ between 350° C.-600° C. under $H_2$/air operation.

FIG. 14 shows the I-V curves and the corresponding powder densities of a 40 wt. % BCZYYb+ 60 wt. % NiO|BCZYYb+1.0 wt % NiO|BCZY63+BCFZY0.1 cell at 350°-600° C. under $H_2$/Air. It is clear that by using BCZY63+BCFZY0.1 composites, excellent power densities can be obtained for PCFC single cells at the low operation temperature range of 350-600° C. under $H_2$/air gradient.

Figure 15:
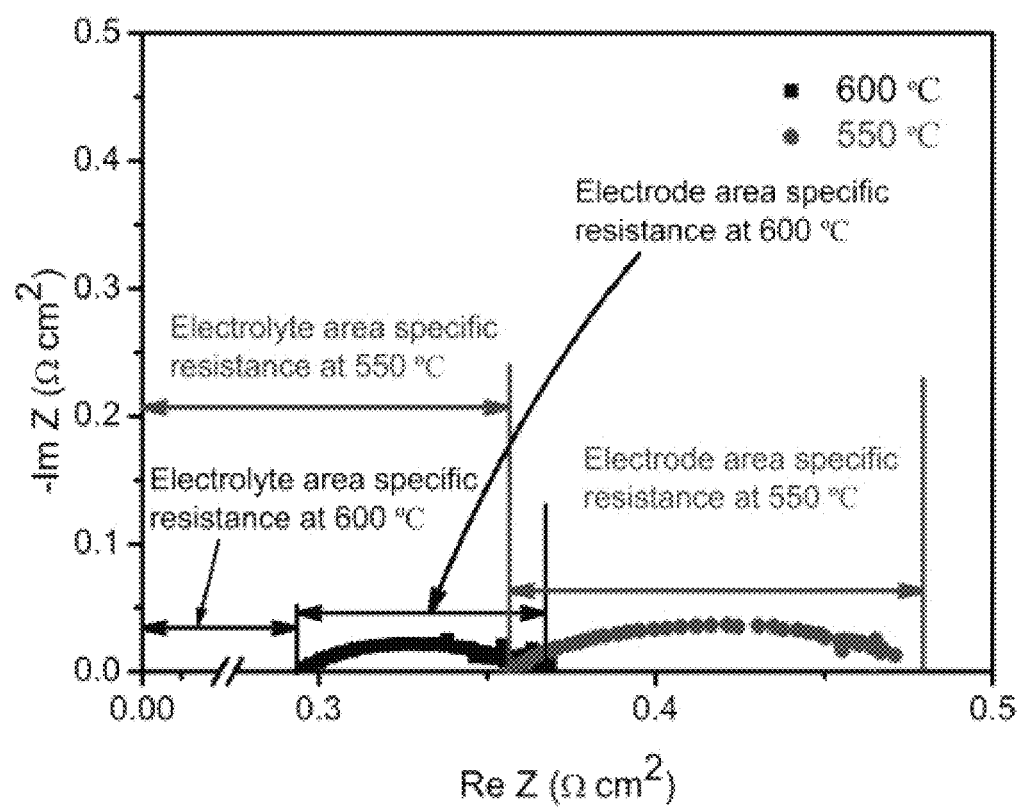
FIG. 15 is a plot of exemplary impedance spectra of 40 wt % BCZYYb+60 wt % NiO|BCZYYb+1.0 wt % NiO|BaCo$_{0.4}$Fe$_{0.4}$Zr$_{0.1}$Y$_{0.1}$O$_{3-\delta}$.

FIG. 15 shows the impedance spectra of the 40 wt. % BCZYYb+60 wt. % NiO|BCZYYb +1.0 wt % NiO|BCFZY0.1 cell (raw impedance data was multiplied by the fuel cell effective area). It is clear that the sum of the ARS values (0.07 Ω·cm$^2$ at 600° C. and 0.12 Ω·cm$^2$ at 500° C.) for the anode and cathode are extremely low, which indicates the excellent cathode performance for the BCFZY0.1 cathode.

Example 4

BCFZY0.1 in a Low Temperature SOFC

Symmetric Cell Fabrication Method

BCFZY0.1 cathode powders were synthesized by previously developed sol-gel method. Calculated amount of Ba(NO$_3$) (Alfa Aesar), Co(NO$_3$)$_2$·6H$_2$O (Alfa Aesar), Fe(NO$_3$)$_3$·9H$_2$O (Alfa Aesar), ZrO(NO$_3$)$_2$ 35 wt. % in dilute nitic acid (Sigma Aldrich), Y(NO$_3$)$_3$·6H$_2$O (Alfa Aesar), EDTA (Alfa Aesar) and Citric Acid (Alfa Aesar) were dissolved in ammonia hydroxide with continuous heating and stirring. By evaporating the water, a dark purple gel was obtained. The gel was put into a dring oven at about 150° C. for about 24 hours to get the dark porous charcoal. The charcoal was ball milled with n-butanol for about 48 hours. Then, the powder was dried at about 100° C. for about 12 hours. The powder was then calcinated at about 600° C. for about 5 hours followed by ball mill again with n-butanol for about 48 hours and dried at about 100° C. for about 12 hours. Finally, cathode powder was obtained.

In order to be compared with BSCF, $Sm_{0.2}Ce_{0.8}O_{2-\delta}$ (SDC, fuelcellmaterials.com, SDC20-TC) was chosen as the electrolyte. SDC precursor powder was dry-pressed under 375 Mpa for about 1.5 minutes in a die with about 19 mm diameter to prepare the symmetric cell electrolyte green pellets (thickness is about 1.5 mm). Then, the pellets were sintered at about 1450° C. for about 5 hours. Reduce the thickness to about 1 mm by grinding both sides of the pellets. Cathode paste was printed on both sides of electrolytes in the center followed by sintering at about 900° C. for about 5 hours. Effective cathode area is about 0.2 cm$^2$. Then, a complete symmetric cell was fabricated.

Single Cell Fabrication

Cells 1 and 2 were prepared as follows. The anode precursor powder (fuelcellmaterials.com, NiO/GDC, Lot #: 279-008, surface area: 6.2 m$^2$/g) was dry-pressed under 375 Mpa for 1.5 minutes in a die with 19 mm diameter to prepare the anode green pellets (thickness is 1.5 mm). GDC powder (fuelcellmaterials.com, GDC10-N, lot #: 274-069, surface area: 201 m$^2$/g) was used as electrolyte precursor. 15 g GDC powder was ball milled with 0.4 mL solsperse 28000 (Lubrizol) as dispersant, 2 mL Di-n-butyphalate (Sigma Aldrich) as a plasticiser and 150 mL IPA as solvent for 24 hours. Dip the green anode pellets into slurry for 3 seconds and put pellets into drying oven (T=100° C.) for 1 hour. Repeat above process for 4 times. After drying, co-fire cells at 1450° C. for 5 hours. Cooling and heating rate is 1.5° C./min. After firing, one side was removed by grinding and a half cell was obtained. By grinding the thickness of anode to 1.2 mm and printing cathode with following sintering at 900° C. for 5 hours, cell 1 was fabricated. By grinding the thickness of anode to 0.4 mm and printing cathode with following sintering at 900° C. for 5 hours, cell 2 was fabricated.

Characterization

Symmetric Cell Test

Gold paste was printed on both sides of symmetric cells as current collector. Electrochemical impedance spectropy (EIS) was performed with a Gamry reference 600 using a single amplitude of about 10 mV under dry air atmosphere and open circuit voltage (OCV) conditions in the frequency range of about $0.01\text{-}10^6$ Hz. EIS was conducted at between about 300° C. and 600° C.

Single Cell Test

Gold paste was printed on anode and cathode side as current collector. Single cell was sealed on alumina tube by glass powder. I-V polarization curves were performed with about 150 mL/min air about and 50 mL/min hydrogen as oxidant and fuel respectively by Gamry reference 3000 over a range of temperatures from 350° C.-500° C.

$O_2$-TPD Test Method

BCFZY0.1, BCFZ and BSCF powder was calcinated at about 900° C. for 5 hours. $O_2$-TPD was measurement by thermogravimetric analysis (TGA). 34 mg powder was loaded into Pt crucible. After treatment under oxygen atmosphere at 950° C., the temperature was decreased to 50° C. Then the $O_2$-TPD was tested by increasing the temperature to 950° C. with a heating rate of 8° C./min under UHP $N_2$. The mass change and temperature were measured and recorded by TGA. Oxygen non-stoichiometry of these three materials was calculated based on mass change. Oxygen desorption rate was calculated based on mass change rate.

Figure 16:
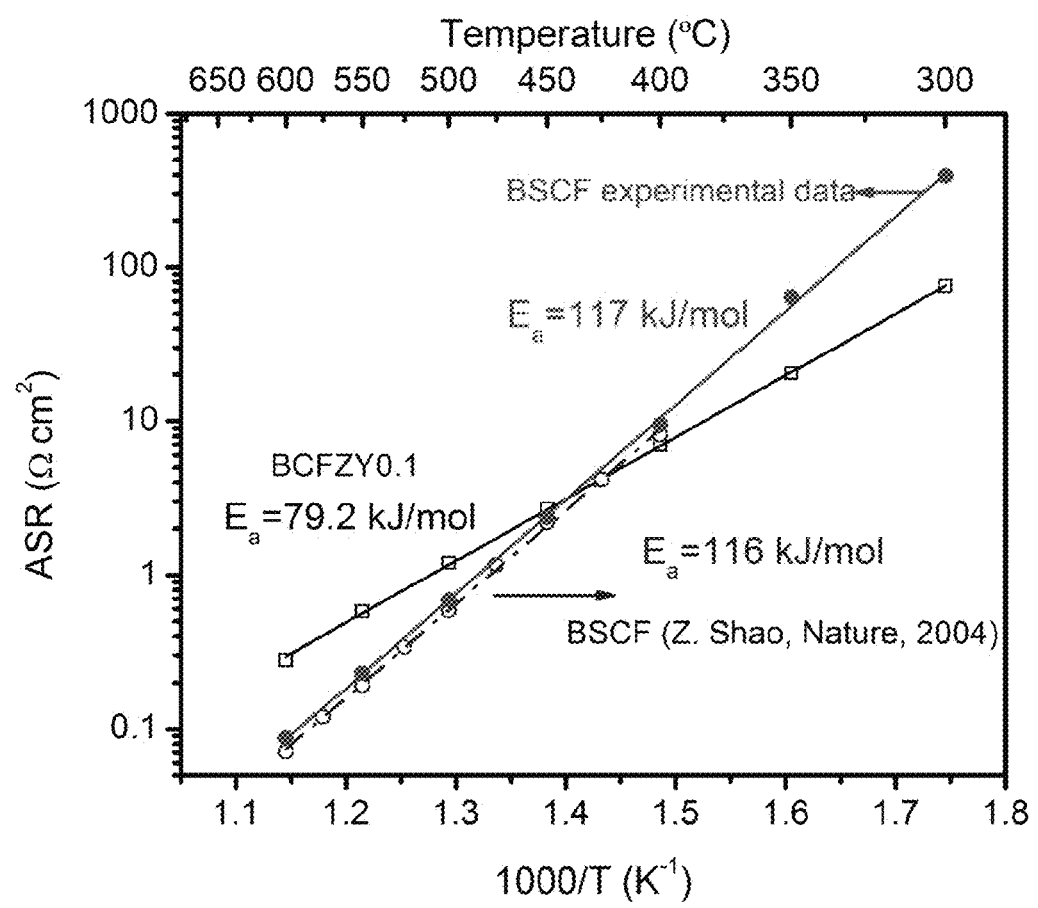
FIG. 16 compares the polarization resistance of BCFZY0.1 to BSCF.
Figure 17:
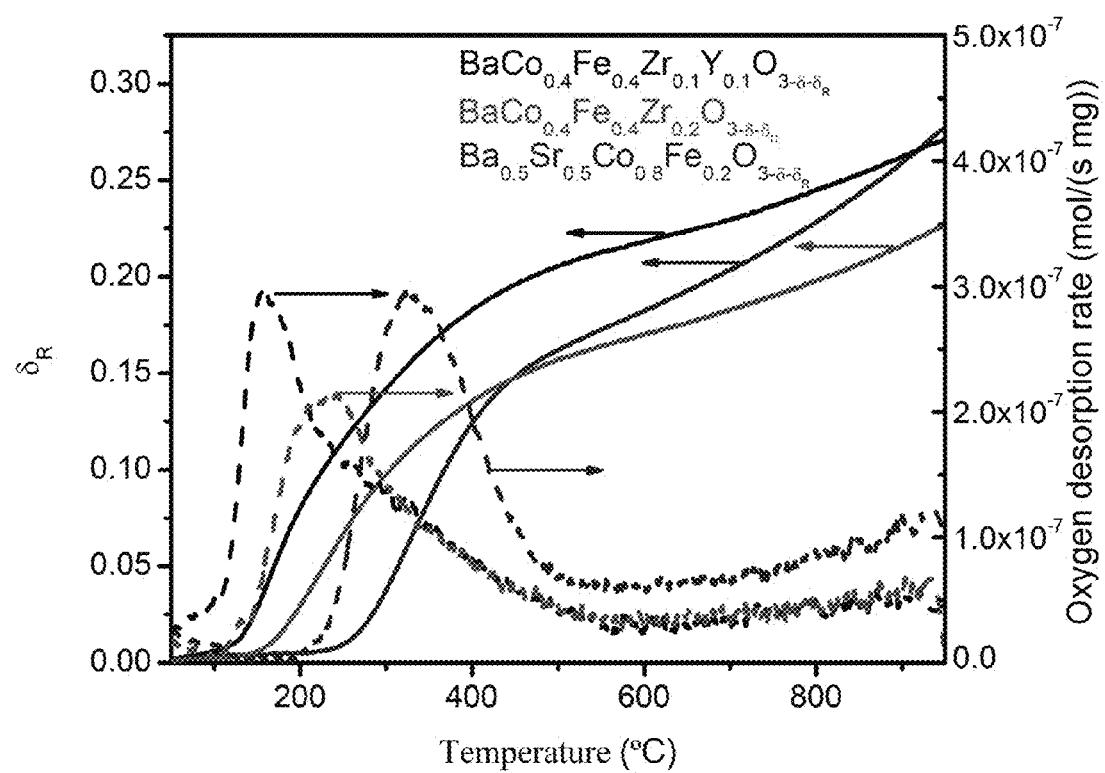
FIG. 17 illustrates ASR stability test of BCFZY0.1|SDC|BCFZY0.1 and BSCF|SDC|BSCF symmetric cells in dry air at 350° C.
Figure 18:
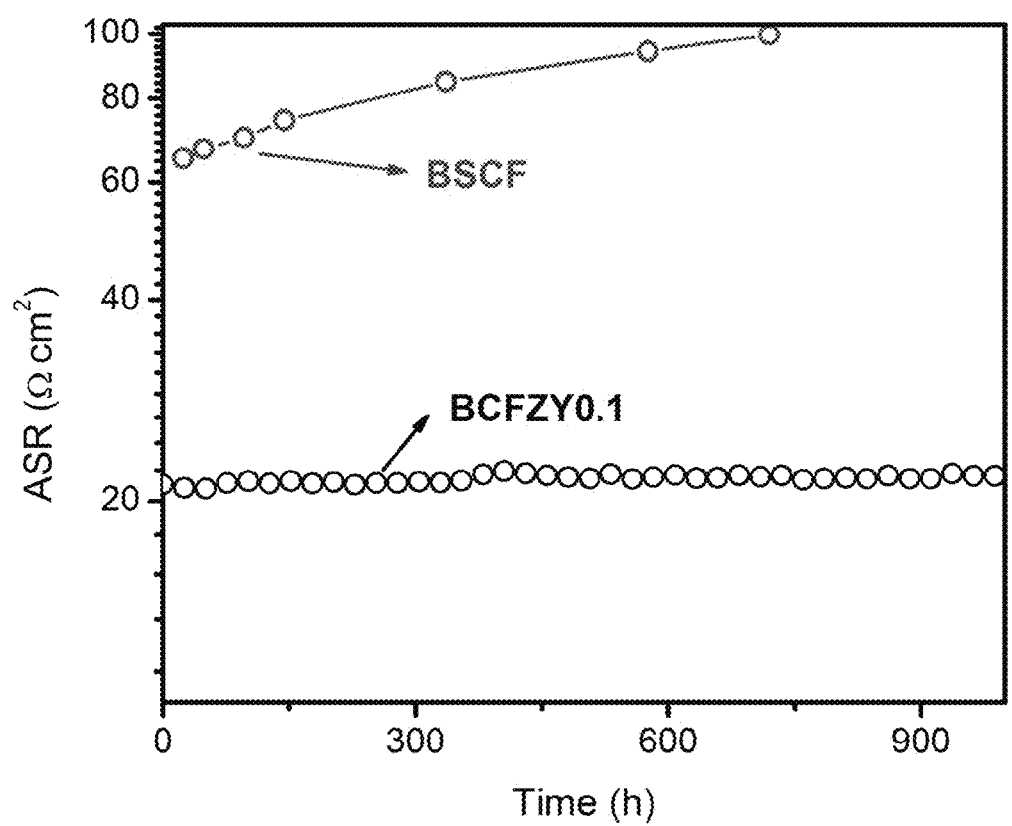
FIG. 18 illustrates ASR as a function of time for BSCF and BCFZY0.1.
Figure 19:
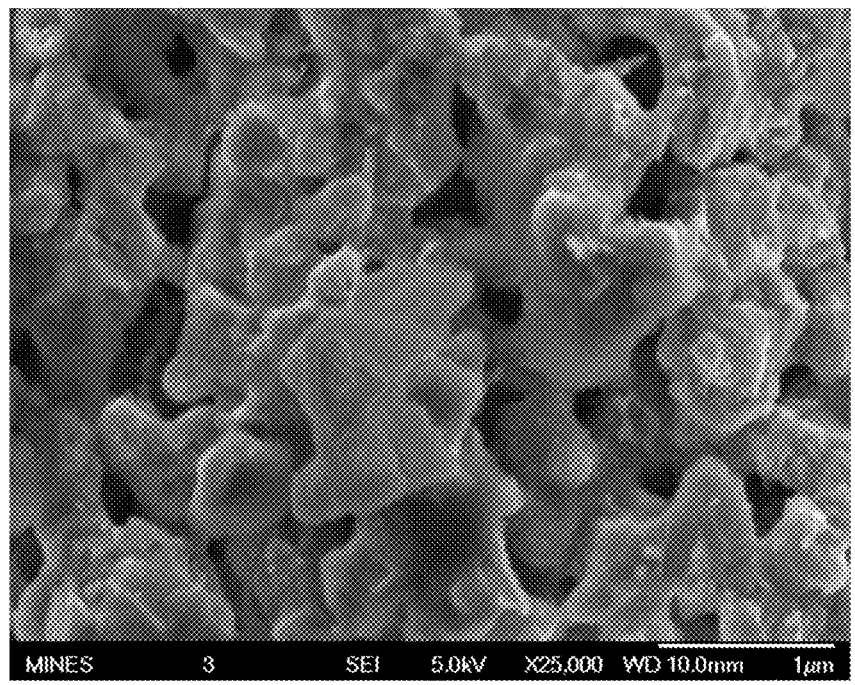
FIG. 19 illustrates a SEM image of a BSCF symmetric cell after 720 hours of operation at about 350° C. in air.
Figure 20:
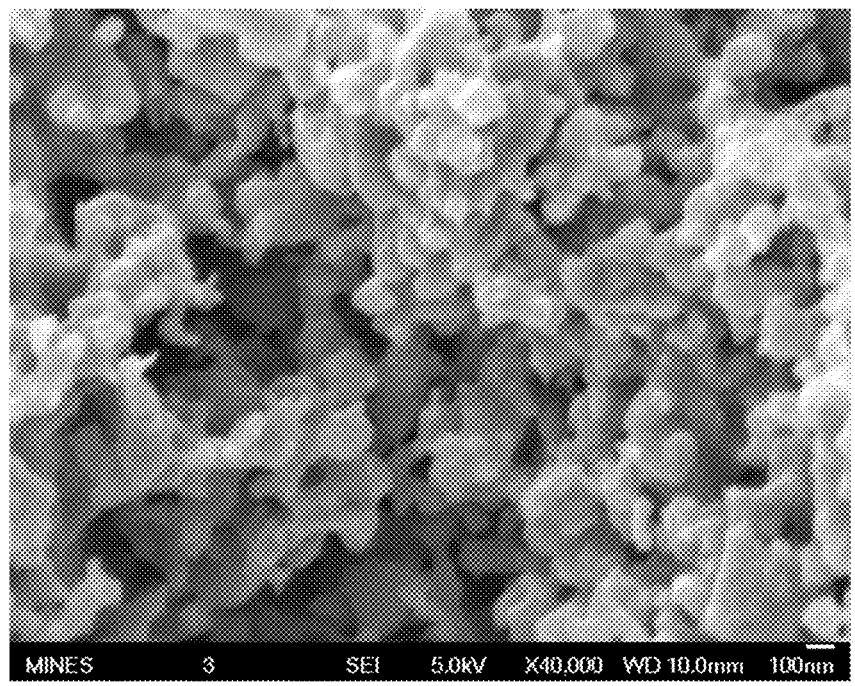
FIG. 20 illustrates a SEM image of a BCFZY0.1 after 1000 hours at 350 C in air.

FIG. 16 compares the polarization resistance of BCFZY0.1 (measured by two-probe electrode impedance using a BCFZY0.1|SDC|BCFZY0.1 symmetric cell) to BSCF (measured by two-probe electrode impedance using a BSCF|SDC|BSCF symmetric cell). Both symmetric cells used a 1 mm thick electrolyte pellet with 20 μm thick symmetric cathodes. BCFZY0.1 shows much lower activation energy (79.2 kJ/mol) than BSCF (117 kJ/mol). For further comparison, previously reported BSCF symmetric cell polarization data from Z. Shao et al., *A High-Performance Cathode for the Next Generation of Solid-Oxide Fuel Cells, Nature,* 431, 170-173 (2004) (incorporated in its entirety by reference), is also included in FIG. 16. Their BSCF polarization resistance and activation energy (116 kJ/mol) closely match the result illustrated from the testing in FIG. 16. While BSCF shows lower area-specific resistance (ASR) than BCFZY0.1 at high temperatures, BCFZY0.1 shows lower ASR than BSCF below 450° C. due to its much lower activation energy. FIG. 17 illustrates ASR stability test of BCFZY0.1|SDC|BCFZY0.1 and BSCF|SDC|BSCF symmetric cells in dry air at 350° C. $O_2$-TPD data measured by TGA indicates that BCFZY0.1 can release surface oxygen at lower temperature compared with BSCF and BCFZ, corroborating its potential for good low-temperature ORR activity. Furthermore, BCFZY0.1 shows promising long-term stability, as illustrated in FIG. 18, which compares the polarization resistance of BCFZY0.1 and BSCF at 350° C. in dry air. BCFZY0.1 maintains stable performance after 1000 hours of testing while the resistance of BSCF increases from 65.0 to 99.7 $\Omega cm^2$ after just 720 hours. Low-temperature instability is a widely noted issue in oxygen permeation membranes based on BSCF. BSCF instability is attributed deleterious phase transformations from the cubic to the hexagonal and/or lamellar trigonal phases at temperatures below 850° C., particularly at grain boundaries[17]. Indeed, post-mortem SEM analysis of the BSCF symmetric cell indicates that second phase impurities are formed on the porous cathode surface after the about 720-hour durability test at 350° C. FIGS. 19 and 20. FIG. 19 illustrates a SEM image of a BSCF symmetric cell after 720 hours of operation at about 350° C. in air. FIG. 20 illustrates a SEM image of a BCFZY0.1 after 1000 hours at 350 C in air. The substitution of $Co^{3+}$ by larger $Zr^{4+}$ and $Y^{3+}$ with constant oxidation state can improve the ORR activity and phase stability of BCFZY0.1.

The promising low-temperature ORR activity and excellent low-temperature stability of BCFZY0.1 highlighted in FIGS. 16-18. To further validate this proposal, several $Ce_{0.8}Gd_{0.2}O_{2-\delta}$ (GDC)-based SOFCs were fabricated by pressing GDC+NiO anode pellets followed by dip-coating the GDC electrolyte and co-firing the anode/electrolyte half-cell at 1500° C. for 5 hours. The BCFZY0.1 cathode was then printed on electrolyte followed by a second sintering step at 900° C. for 5 hours. After sintering, the cathode thickness was 20 μm. Two cells were tested in this work: cell #1, which had a 1.2 mm thick anode, and cell #2, with a much thinner 0.4 mm thick anode.

Figure 21:
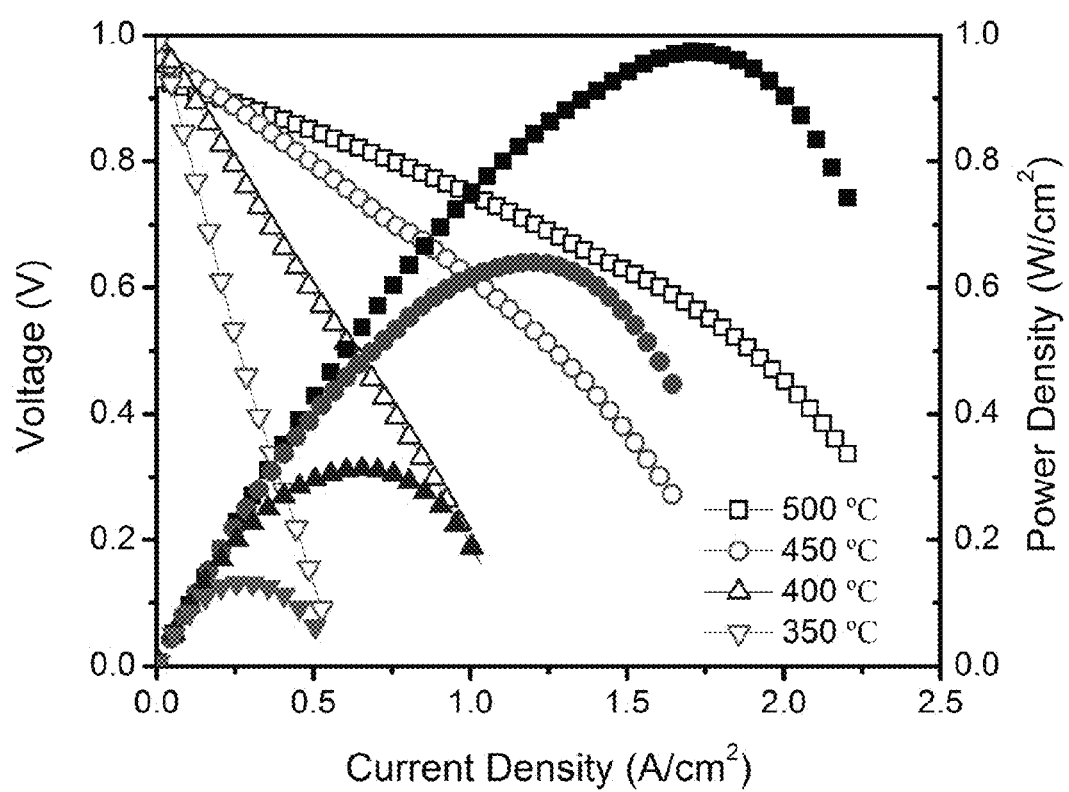
FIG. 21 illustrates the polarization (I-V) and corresponding power density curves (I-P) of the optimized cell #2.
Figure 22:
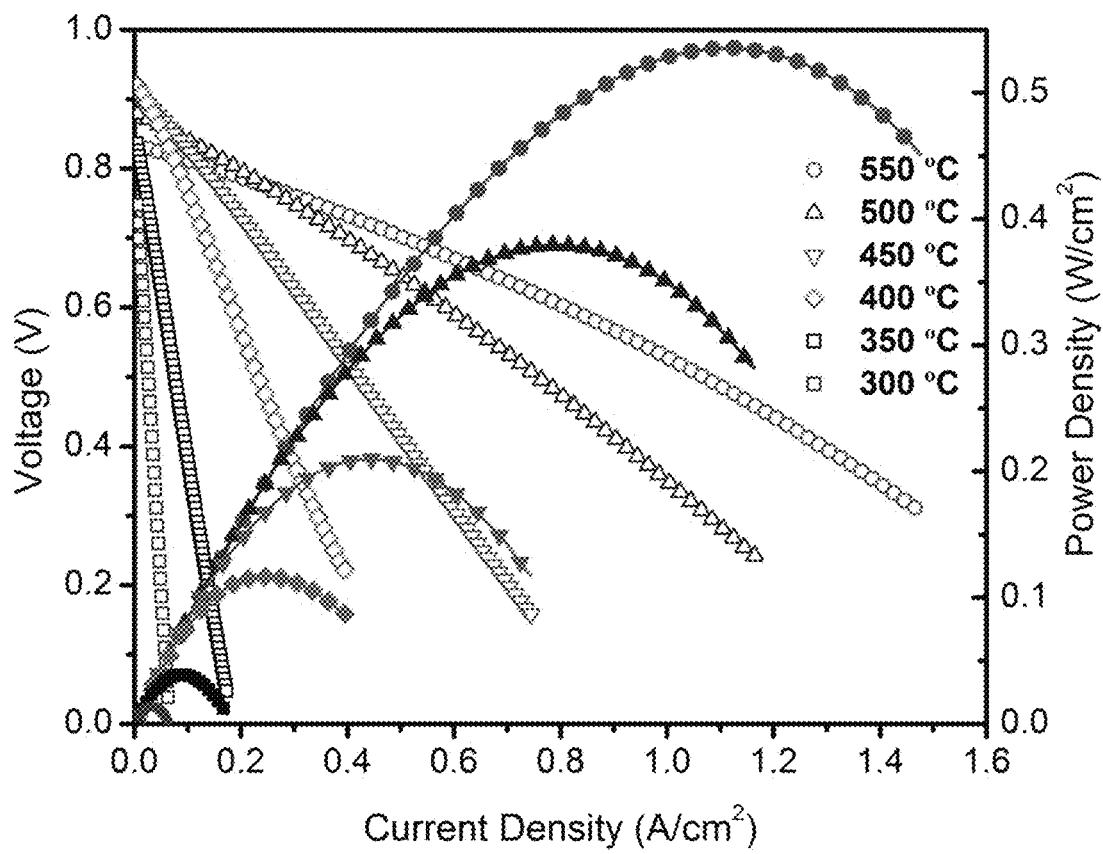
FIG. 22 illustrates I-V and corresponding I-P curves of unoptimized cell #1 with BCFZ0.1 as the cathode in H$_2$/air from about 300° C. to about 550° C.

FIG. 21 illustrates the polarization (I-V) and corresponding power density curves (I-P) of the optimized cell #2. Comparable data for cell #1 is provided in FIG. 22. FIG. 22 illustrates I-V and corresponding I-P curves of unoptimized cell #1 with BCFZ0.1 as the cathode in $H_2$/air from about 300° C. to about 550° C. Compared to cell #1, the thinner anode achieved in cell #2 leads to higher performance. The cell achieves peak power densities are of 0.97, 0.64, 0.32 and 0.13 $W/cm^2$ at 500° C., 450° C., 400° C. and 350° C., respectively. The peak power density at 500° C. is among the highest ever reported for an SOFC at this temperature. Table 1 illustrates performance comparisons for low temperature SOFCs compared to literature references.

TABLE 1

| Cell composition | Measurement condition | Temperature | Peak power density (W/cm$^2$) |
|---|---|---|---|
| GDC-based LT-SOFC with BCFZY0.1 cathode | $H_2$ (50 mL/min)|Air (150 mL/min) | 500° C. | 0.97 |
| GDC-based LT-SOFC with BCFZY0.1 cathode | $H_2$ (50 mL/min)|Air (150 mL/min) | 450° C. | 0.64 |
| GDC-based LT-SOFC with BCFZY0.1 cathode | $H_2$ (50 mL/min)|Air (150 mL/min) | 400° C. | 0.32 |
| GDC-based LT-SOFC with the core/shell-fibre-structured BSCF-GDC cathode | $H_2$ (60 mL/min)|Air (250 mL/min) | 500° C. | 1.58 |
| GDC-based LT-SOFC with the core/shell-fibre-structured BSCF-GDC cathode | $H_2$ (60 mL/min)|Air (250 mL/min) | 450° C. | 0.84 |
| GDC-based SOFC with PBSCF05-GDC composite cathode | $H_2$ with 3 v % $H_2O$ (100 mL/min)| Ambient air | 500° C. | 0.67 |

TABLE 1-continued

| Cell composition | Measurement condition | Temperature | Peak power density (W/cm$^2$) |
|---|---|---|---|
| SDC-based SOFC with SNC0.95 cathode | H$_2$ (80 mL/min)\|Ambient air | 500° C. | 1.02 |
| SDC-based SOFC with SNC0.95 cathode | H$_2$ (80 mL/min)\|Ambient air | 450° C. | 0.66 |
| SDC-based SOFC with SNC0.95 cathode | H$_2$ (80 mL/min)\|Ambient air | 400° C. | 0.37 |
| GDC-based SOFC with LBSCF-40GDC composite cathode | H$_2$ (100 mL/min)\|air | 500° C. | 0.65 |
| GDC-based SOFC with B$_{0.9}$CFN cathode | H$_2$ (80 mL/min)\|Ambient air | 500° C. | 0.42 |
| GDC-based SOFC with LSCF nanostructured cathode | H$_2$\|Oxygen | 500° C. | 0.297 |

TABLE 1-continued

| Cell composition | Measurement condition | Temperature | Peak power density (W/cm$^2$) |
|---|---|---|---|
| GDC-based SOFC with LSCF nanostructured cathode | H$_2$\|Oxygen | 450° C. | 0.131 |
| GDC-based SOFC with PBSC hollow nano fiber cathode | H$_2$ with 3 v % H$_2$O\|Ambient air | 500° C. | 0.62 |
| GDC-based SOFC with PBSC hollow nano fiber cathode | H$_2$ with 3 v % H$_2$O\|Ambient air | 450° C. | 0.36 |

Figure 23:
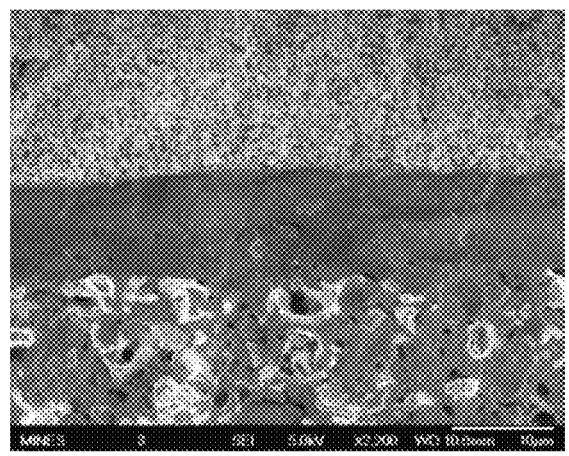
FIG. 23 illustrates a representative cross section SEM image of cell #2 after testing.
Figure 24:
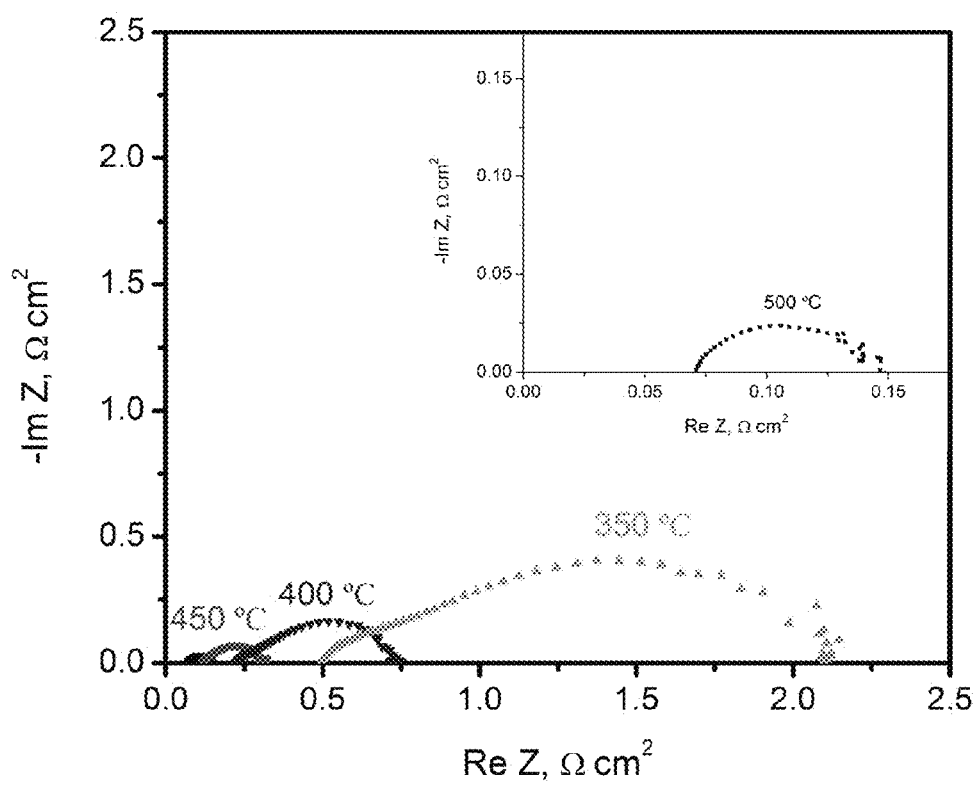
FIG. 24 illustrates the AC impedance (Nyquist) plots of cell #2 measured in H$_2$/Air under open circuit voltage (OCV) at 350-500° C.
Figure 25:
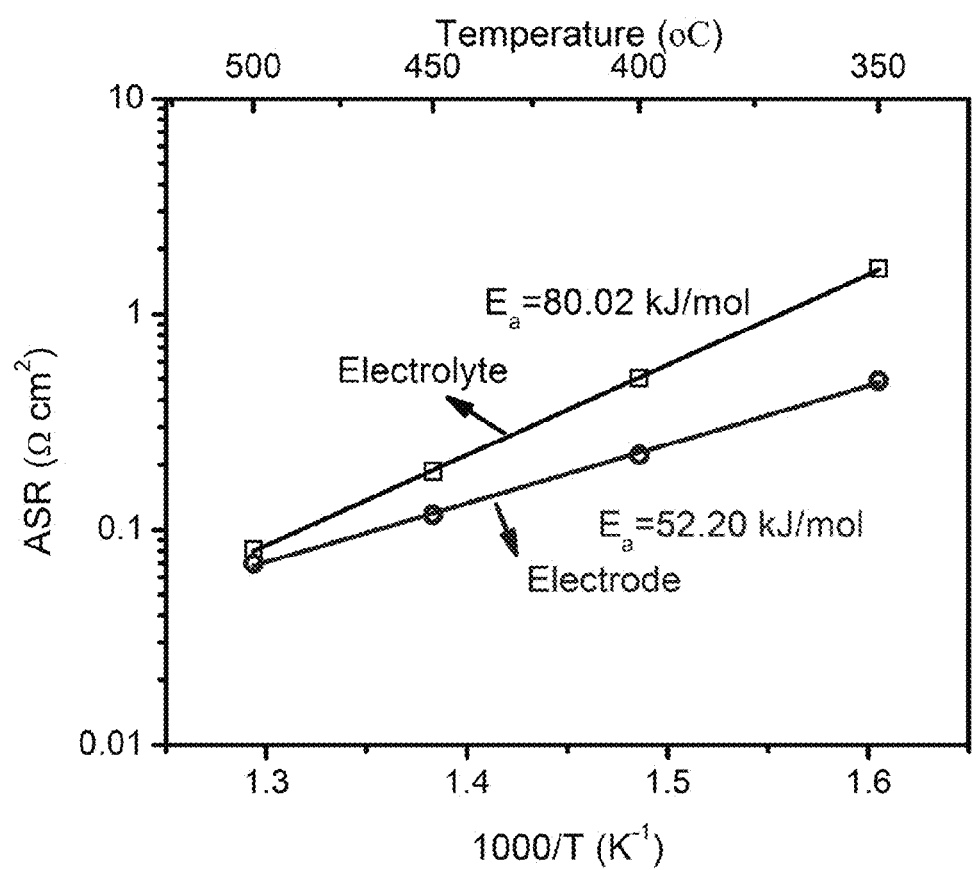
FIG. 25 illustrates the data of FIG. 24 in an Arrhenius plot.

FIG. 23 illustrates a representative cross section SEM image of cell #2 after testing. The thickness of electrolyte is 7 μm. FIG. 24 illustrates the AC impedance (Nyquist) plots of cell #2 measured in H$_2$/Air under open circuit voltage (OCV) at 350-500° C. Ohmic (ASR$_{ohm}$) and electrode polarization (ASR$_p$) area-specific-resistances can be extracted from the high-frequency real impedance intercept and the diameter of the impedance arc respectively. These data are illustrated in an Arrhenius plot in FIG. 25. The electrode polarization activation energy determined for the full cell in FIG. 25 (80 kJ/mol) closely matches the value determined previously from the BCFZY symmetric cell illustrated in FIG. 16 (79 kJ/mol), and is substantially lower than the activation energy reported for other emerging low-temperature SOFC cathodes such as PrBa$_{0.5}$Sr$_{0.5}$Co$_{1.5}$Fe$_{0.5}$O$_{5+\delta}$ or NdBa$_{0.75}$Ca$_{0.25}$Co$_2$O$_{5+\delta}$. The absolute values of ASR$_p$ are also encouraging; they are in the range of about 0.1-1 Ωcm$^2$ at temperatures of about 500-350° C.

Figure 26:
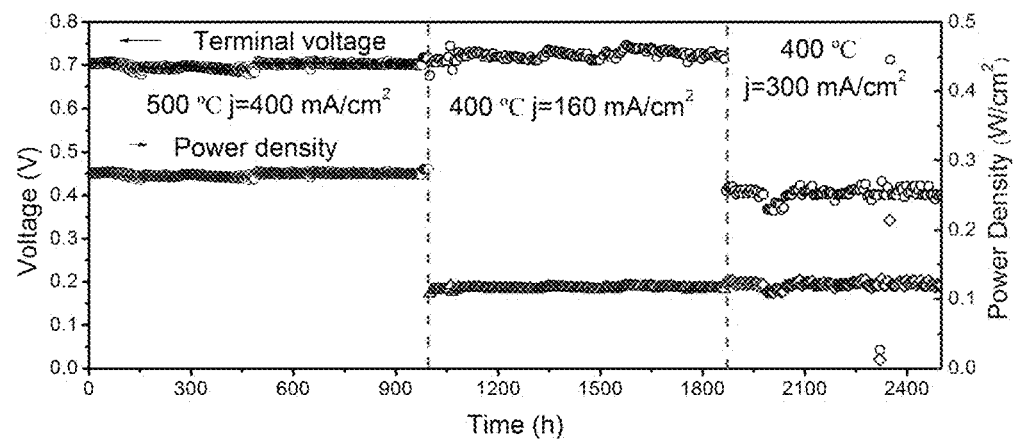
FIG. 26 illustrates the voltage and power density as a function of time.

To examine the long-term stability of the cathode, cell #1 was operated under a series of constant load conditions and temperatures for a total of more than 2500 hours without observable performance degradation (FIG. 26). Table 2 illustrates long term durability comparisons for BCFZY0.1 cells and other SOFCs from literature.

TABLE 2

| Cell composition | Measurement condition | Temperature | Stability/degradation rate |
|---|---|---|---|
| GDC-based LT-SOFC with BCFZY0.1 cathode | H$_2$ (50 mL/min)\|Air (150 mL/min) | 500° C./400° C. | Current density = 0.4 A/cm$^2$<br>Current density = 0.16 A/cm$^2$<br>Current density = 0.3 A/cm$^2$<br>Total 2500 hours operation without degradation |
| GDC-based LT-SOFC with the core/shell-fibre-structured BSCF-GDC cathode | H$_2$ (60 mL/min)\|Air (250 mL/min) | 550° C. | Current density = 1 A/cm$^2$<br>Degradation rate = 5.6% for 250 hours<br>Current density = 0.5 A/cm$^2$<br>Degradation rate = 0.6% for 50 hours |
| SOFC with nanoparticulate LSM infiltrated cathode | H$_2$ with 3 v % H$_2$O\|air | 650° C. | Current density = 0.15 A/cm$^2$<br>500 hours stable operation |
| YSZ-based SOFC with LSM-YSZ nano-composite | H$_2$ with 3 v % H$_2$O (200 mL/min)\|Air (300 mL/min) | 800° C. | Current density = 1 A/cm$^2$<br>550 hours stable operation |
| GDC-based SOFC with PBSCF05-GDC composite cathode | H$_2$ with 3 v % H$_2$O (100 mL/min)\|Ambient air | 550° C. | Constant Voltage 0.6 V<br>150 hours stable operation |

Figure 27:
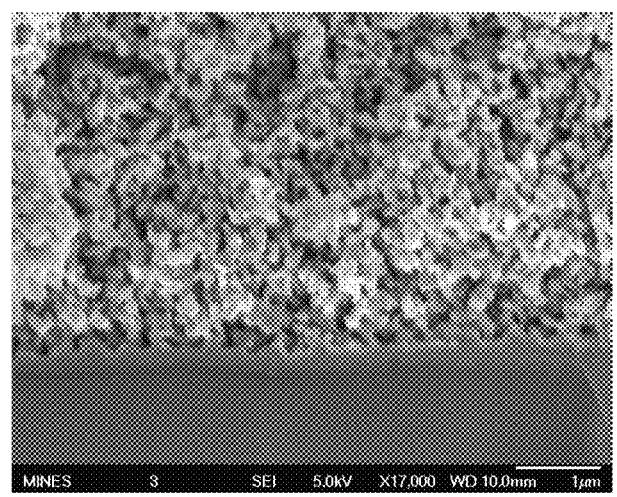
FIG. 27 illustrates a high-magnification SEM cross-section image of the cathode-electrolyte interface after about 2500-hour durability test.
Figure 28:
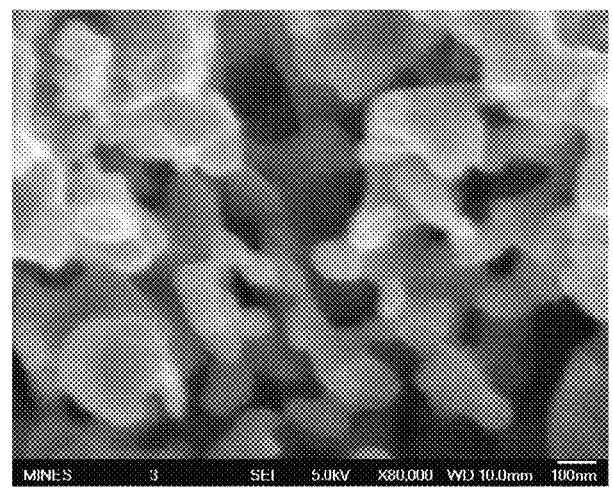
FIG. 28 illustrates a high-magnification SEM cross-section image of the cathode bulk after about 2500-hour durability test.

High-magnification SEM cross-section images of the cathode-electrolyte interface (FIG. 27) and cathode bulk (FIG. 28) after an about 2500-hour durability test show no signs of delamination or interfacial reaction. There are no signs of coarsening or phase separation within the cathode bulk and the cathode morphology of the tested cell appears identical to an unused cell, with an average cathode particle size less than about 100 nm.

Although it is infrequently examined, thermal cycling stability is crucially important for SOFC commercialization, particularly for applications requiring start/stop capability or transient/variable loads. While not all SOFC applications will encounter significant thermal cycling, it can nevertheless also be used as an accelerated stress-test to gain insight into SOFC durability and degradation under aggressive operating conditions or in the case of unplanned shut-down events.

Figure 29:
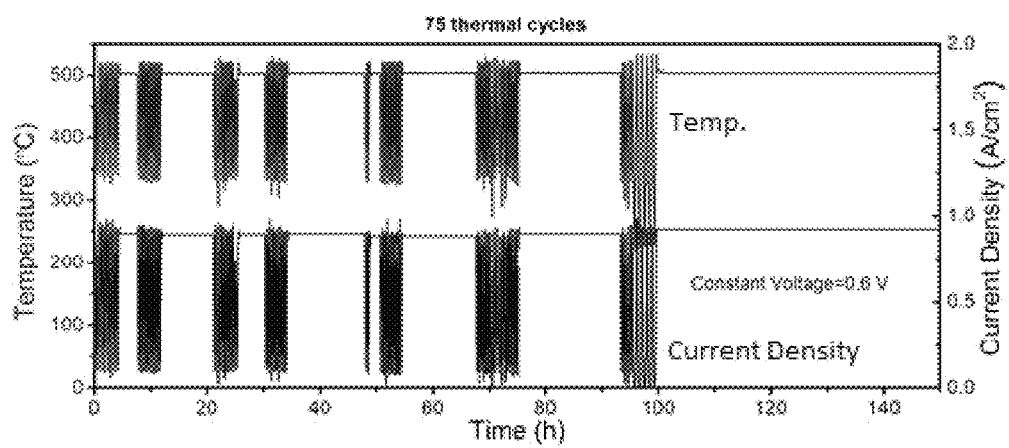
FIG. 29 illustrates a thermal cycling measurement of cell #2 cycling between 250° C. and 525° C. with up to 18° C./min heating and cooling rate.
Figure 30:
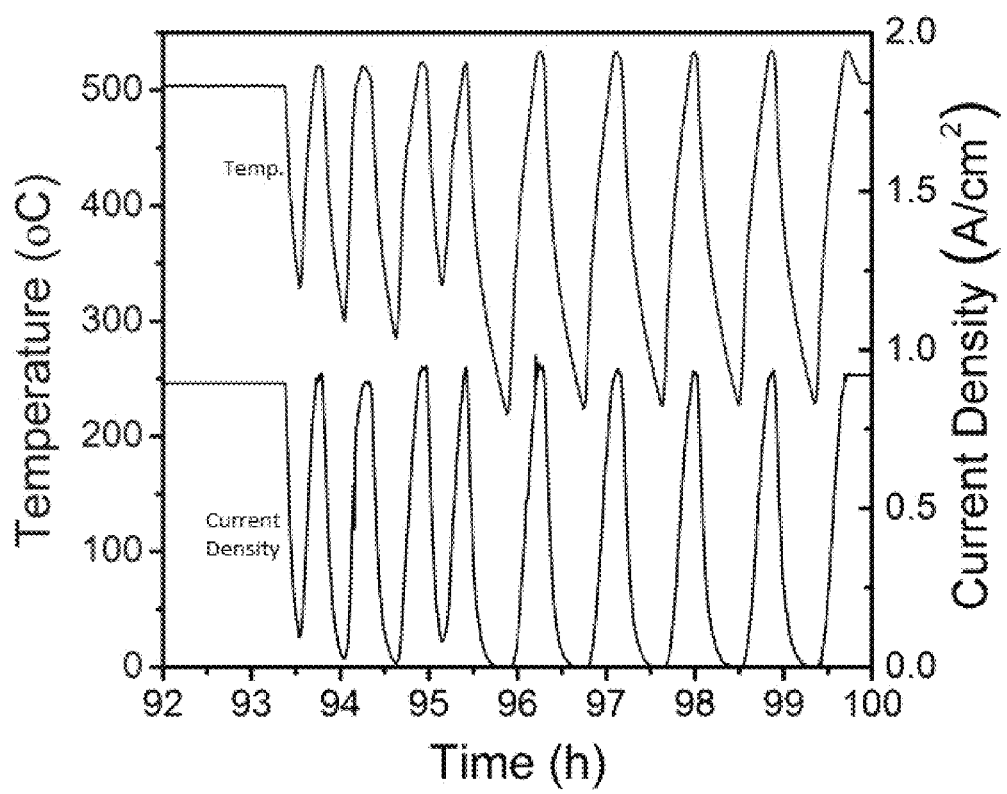
FIG. 30 illustrates additional details of the thermal cycle data in the time range 92-100 hours.
Figure 31:
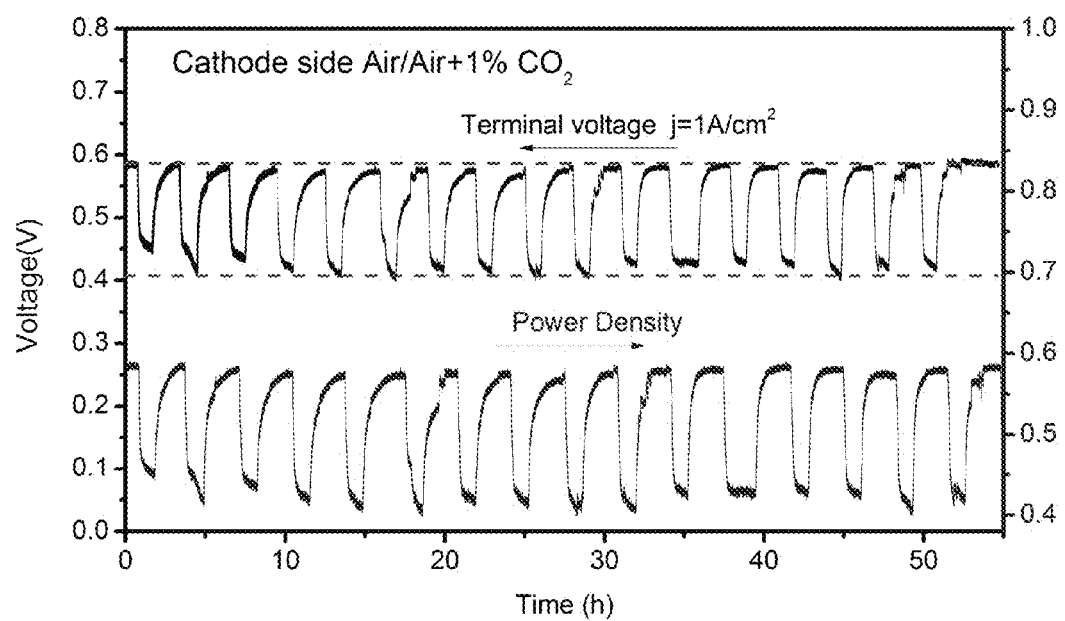
FIG. 31 illustrates the stability measurements of BCFZY0.1 cell #2 at a constant current density of 1 A/cm$^2$ at 500° C. while cycling between pure air and air+1% CO$_2$.
Figure 32:
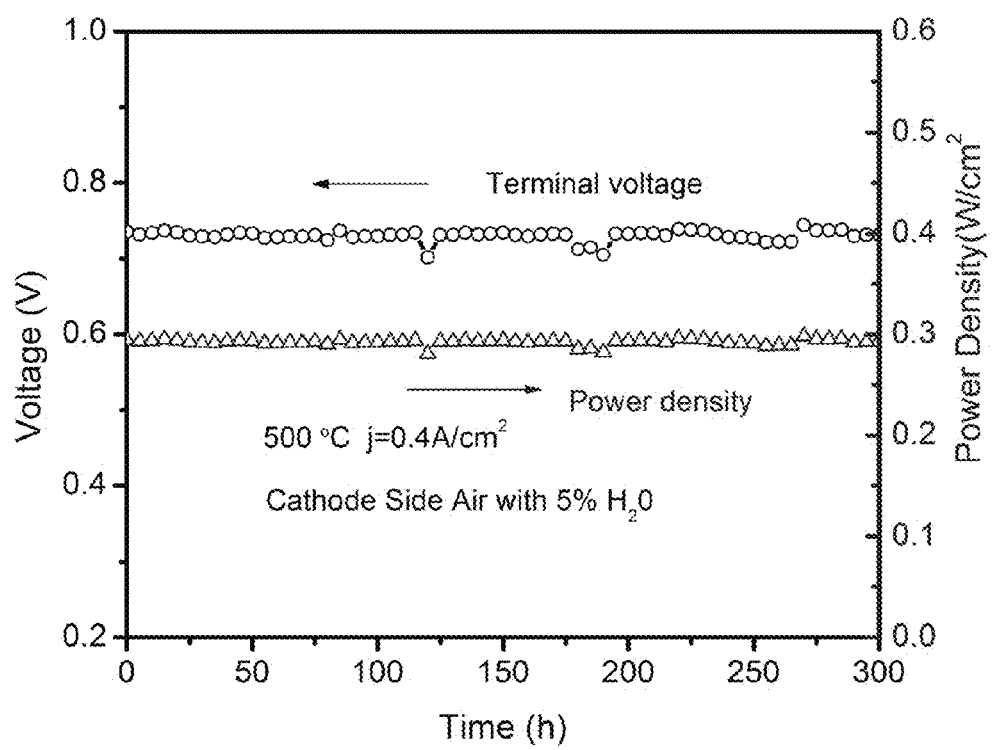
FIG. 32 illustrates long-term stability measurement of BCFZY0.1 cell #1 at a constant current density of 400 mA/cm$^2$ at 500° C. with 5% H$_2$O in air (Po$_2$=0.21 atm) for 300 hours.

FIG. 29 illustrates a thermal cycling measurement of cell #2 cycling between 250° C. and 525° C. with up to 18° C./min heating and cooling rate. The sample was cycled 75 times. Output current was recorded at a constant voltage of 0.6 V. FIG. 30 illustrates additional details of the thermal cycle data in the time range 92-100 hours. FIG. 31 illustrates short-term stability measurements of BCFZY0.1 cell #2 at a constant current density of 1 A/cm$^2$ at 500° C. while cycling between pure air and air+1% CO$_2$. Because of very low flow rate of CO$_2$, irregularities in the mass-flow control of the CO$_2$ flow rate results in the slight inconsistencies in the terminal voltage under CO$_2$ testing. FIG. 32 illustrates long-term stability measurement of BCFZY0.1 cell #1 at a constant current density of 400 mA/cm$^2$ at 500° C. with 5% H$_2$O in air (P$_{O2}$=0.21 atm) for 300 hours.

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of fabricating a solid oxide fuel cell comprising:
    depositing a precursor electrolyte layer on at least a portion of an anode layer;
    depositing a precursor cathode layer on at least a surface of the precursor electrolyte layer to form a structure; and
    heating the structure to between about 1200° C. and about 1600° C. for between about 5 hours and about 25 hours to form the solid oxide fuel cell comprising the anode layer, an electrolyte layer, and a cathode layer comprised of BaCo$_{0.4}$Fe$_{0.4}$Zr$_{0.2-x}$Y$_x$O$_{3-\delta}$, wherein x is greater than 0 and less than 0.2, and wherein $\delta$ is between about 0 and about 0.3.

2. The method of claim 1, wherein the cathode layer has a thickness of between about 5 microns and about 70 microns.

3. The method of claim 1, wherein x is between about 0 and about 0.2.

4. The method of claim 1, wherein the anode layer is comprised of at least one of a BaCe$_{0.7}$Zr$_{0.1}$Y$_{0.1}$Yb$_{0.1}$O$_{3-\delta}$—Ni, a BaCe$_{0.6}$Zr$_{0.3}$Y$_{0.1}$O$_{3-\delta}$—Ni, BaZr$_{0.8}$Y$_{0.2}$O$_{3-\delta}$—Ni, and a BaCe$_{0.8}$Y$_{0.2}$O$_{3-\delta}$—Ni and the electrolyte layer is comprised of at least one a BaCe$_{0.7}$Zr$_{0.1}$Y$_{0.1}$Yb$_{0.1}$O$_{3-\delta}$-1.0 wt % NiO, a BaCe$_{0.7}$Zr$_{0.1}$Y$_{0.1}$Yb$_{0.1}$O$_{3-\delta}$-1.0 wt % CoO, a BaCe$_{0.7}$Zr$_{0.1}$Y$_{0.1}$Yb$_{0.1}$O$_{3-\delta}$-1.0 wt % CuO, a BaCe$_{0.7}$Zr$_{0.1}$Y$_{0.1}$Yb$_{0.1}$O$_{3-\delta}$-1.0 wt % ZnO, a BaZr$_{0.8}$Y$_{0.2}$O$_{3-\delta}$-1.0 wt % NiO, a BaZr$_{0.8}$Y$_{0.2}$O$_{3-\delta}$-1.4 wt % CuO, a BaZr$_{0.8}$Y$_{0.2}$O$_{3-\delta}$-1.0 wt % CoO, a BaZr$_{0.8}$Y$_{0.2}$O$_{3-\delta}$-1.0 wt % ZnO, a BaCe$_{0.6}$Zr$_{0.3}$Y$_{0.1}$O$_{3-\delta}$-1.3 wt % CuO, a BaCe$_{0.6}$Zr$_{0.3}$Y$_{0.1}$O$_{3-\delta}$-1.0 wt % NiO, a BaCe$_{0.6}$Zr$_{0.3}$Y$_{0.1}$O$_{3-\delta}$-1.0 wt % CoO, a BaCeO$_{0.6}$Zr$_{0.3}$Y$_{0.1}$O$_{3-\delta}$-1.0 wt % ZnO, a BaCe$_{0.8}$Y$_{0.2}$O$_{3-\delta}$-1.0 wt % CoO, a BaCe$_{0.8}$Y$_{0.2}$O$_{3-\delta}$-1.0 wt % NiO, a BaCe$_{0.8}$Y$_{0.2}$O$_{3-\delta}$-1.0 wt % ZnO, and a BaCe$_{0.8}$Y$_{0.2}$O$_{3-\delta}$-1.0 wt % CuO.

5. The method of claim 1, wherein the cathode is a porous film cathode.

6. The method of claim 1, wherein the anode is comprised of at least one of a BaCe$_{0.7}$Zr$_{0.1}$Y$_{0.1}$Yb$_{0.1}$O$_{3-\delta}$—Ni, a BaCe$_{0.6}$Zr$_{0.3}$Y$_{0.1}$O$_{3-\delta}$—Ni, a BaZr$_{0.8}$Y$_{0.2}$O$_{3-\delta}$—Ni, and a BaCe$_{0.8}$Y$_{0.2}$O$_{3-\delta}$—Ni.

7. The method of claim 1, wherein the cathode further comprises a cathode bone with a formula of BaCe$_{0.6}$Zr$_{0.3}$Y$_{0.1}$O$_{3-\delta}$.

8. The method of claim 7, wherein the BaCo$_{0.4}$Fe$_{0.4}$Zr$_{0.1}$Y$_{0.1}$O$_{3-\delta}$ is a plurality of nanoparticles and wherein the plurality of nanoparticles is deposited on at least one wall of the cathode bone.

9. The method of claim 1, wherein the cathode layer is BaCo$_{0.4}$Fe$_{0.4}$Zr$_{0.1}$Y$_{0.1}$O$_{3-\delta}$.

10. The method of claim 9, wherein a thickness of the cathode layer is between about 5 and about 70 microns.

11. The method of claim 1, wherein x is greater than 0 and less than 0.15.

12. The method of claim 1, wherein x is 0.1.

13. The method of claim 1, wherein a gel or paste of the precursor cathode layer comprises a cathode powder and terpinol.

14. The method of claim 13, wherein the cathode powder comprises BSCF, BCFZ, or BCFZY0.1.

15. The method of claim 1, further comprising sintering the precursor cathode layer at a temperature between about 700° C. and about 1000° C.

16. The method of claim 15, wherein the sintering takes between for about 2 hours and about 10 hours.

17. The method of claim 1, further comprising forming a material for the precursor cathode layer, comprising:
    dissolving a cathode material in ammonia hydroxide to form a gel;
    heating the gel to a temperature between about 120° C. and about 180° C., for between about 10 hours and about 36 hours to produce a charcoal;
    milling the charcoal to form a milled charcoal; and
    calcining the milled charcoal at a temperature between about 400° C. and about 800° C. for between about 3 hours and about 10 hours to produce a calcined powder.

18. The method of claim 17, further comprising:
    milling the calcined powder with a solvent for between about 24 hours and about 72 hours to produce a milled powder; and
    drying the milled powder at a temperature between about 120° C. and about 250° C., for between about 5 hours and about 10 hours to form the cathode powder.

19. The method of claim 18, wherein the solvent is at least one of a n-butanol, an isopropanol, an ethanol, an acetone, a methanol, or a toluene.

20. The method of claim 1, wherein the precursor cathode layer is deposited using a method of at least one of a painting, a dipping, a spraying, a screen printing, a spray coating, a tape casing, or a slot dyeing.

* * * * *